United States Patent
Hirano et al.

(10) Patent No.: US 7,068,901 B2
(45) Date of Patent: Jun. 27, 2006

(54) OPTICAL FIBER PREFORM PRODUCING METHOD, OPTICAL FIBER PRODUCTION METHOD, AND OPTICAL FIBER

(75) Inventors: Masaaki Hirano, Yokohama (JP); Eiji Yanada, Yokohama (JP); Tomoyuki Yokokawa, Yokohama (JP); Takashi Sasaki, Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 11 days.

(21) Appl. No.: 10/494,278

(22) PCT Filed: Apr. 16, 2003

(86) PCT No.: PCT/JP03/04823

§ 371 (c)(1),
(2), (4) Date: Apr. 30, 2004

(87) PCT Pub. No.: WO03/086997

PCT Pub. Date: Oct. 23, 2003

(65) Prior Publication Data

US 2004/0247269 A1 Dec. 9, 2004

(30) Foreign Application Priority Data

Apr. 16, 2002 (JP) .............................. 2002-113280

(51) Int. Cl.
*G02B 6/22* (2006.01)

(52) U.S. Cl. ...................... 385/127; 385/124; 385/126; 65/406; 65/412

(58) Field of Classification Search ................ 385/124, 385/126, 127; 65/404–435

See application file for complete search history.

(56) References Cited

U.S. PATENT DOCUMENTS

| | | | |
|---|---|---|---|
| 6,317,549 B1* | 11/2001 | Brown | 385/123 |
| 6,574,994 B1* | 6/2003 | Cain et al. | 65/391 |
| 2002/0000104 A1 | 1/2002 | Ijiri et al. | |

FOREIGN PATENT DOCUMENTS

| | | |
|---|---|---|
| EP | 8-225335 A | 6/1996 |
| EP | 718244 A2 | 6/1996 |
| EP | 1 061 054 A1 | 12/2000 |
| JP | 5-286735 A | 11/1993 |
| JP | 2001-247324 A | 9/2001 |

* cited by examiner

Primary Examiner—John D. Lee
Assistant Examiner—Rhonda S. Peace
(74) Attorney, Agent, or Firm—McDermott Will & Emery LLP

(57) ABSTRACT

An optical fiber preform comprises a central core portion having a maximal value Nc of refractive index in the center, and outside the central core portion, comprising at least a depressed portion having a minimal value Nd of refractive index, a ring portion having a maximal value Nr of refractive index and an outside cladding layer having a maximal value No of refractive index. The optical fiber preform satisfies a relation of $Nc \geq Nr > No > Nd$ among the values of refractive index. A method of the optical fiber preform comprises fabricating a glass rod by inserting a rod containing at least the central core portion into a pipe containing at least the depressed portion and integrating them, fabricating a glass pipe having the ring portion, and fabricating a vitreous body by integrating the glass rod and the glass pipe by collapsing after inserting the glass rod into the glass pipe.

27 Claims, 23 Drawing Sheets

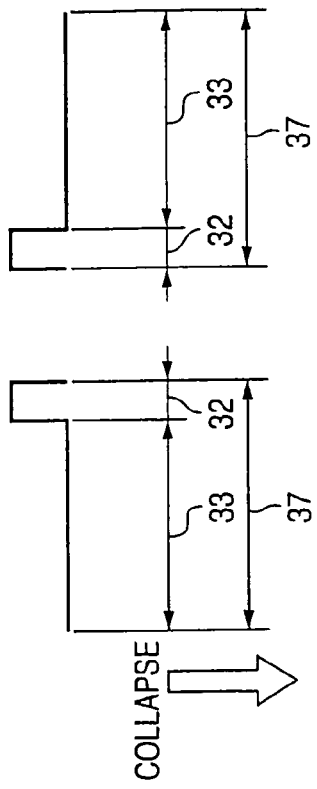
FIG. 3 (a) GLASS ROD
FIG. 3 (b) GLASS PIPE
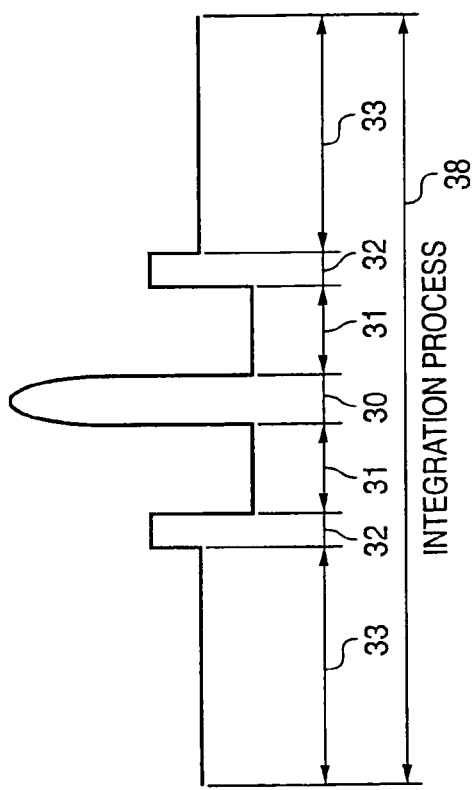
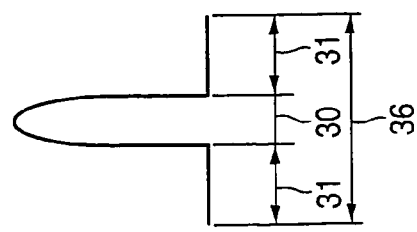
FIG. 3 (c)

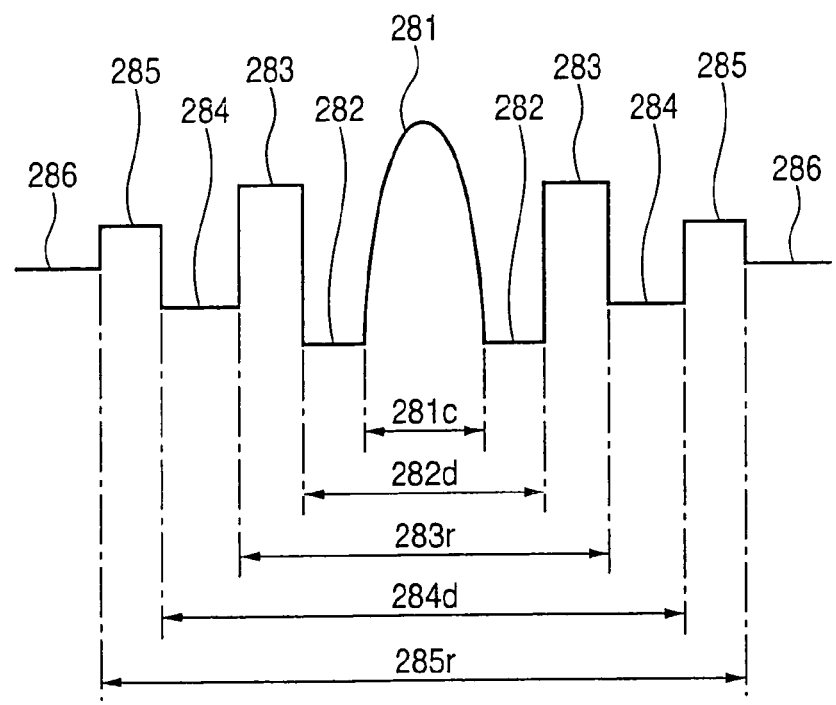
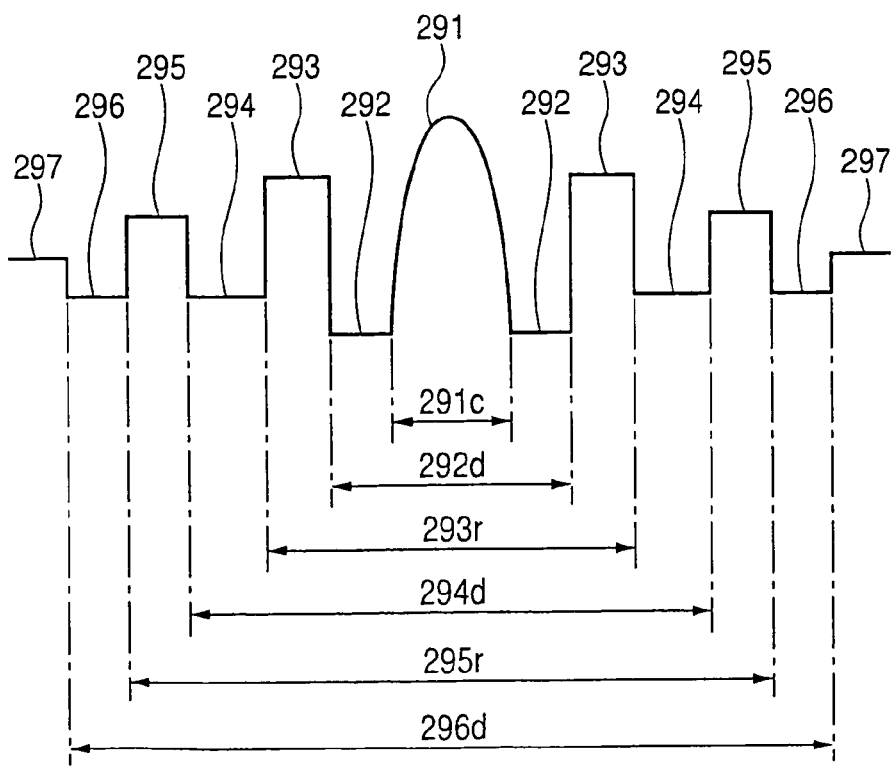

OPTICAL FIBER PREFORM PRODUCING METHOD, OPTICAL FIBER PRODUCTION METHOD, AND OPTICAL FIBER

TECHNICAL FIELD

The present invention relates to a manufacturing method for an optical fiber preform, a manufacturing method for an optical fiber, and an optical fiber.

BACKGROUND ART

Conventionally, there are well-known methods for fabricating an optical fiber preform, including an MCVD method (Modified Chemical Vapor Deposition Method) and an OVD method (Outside Vapor Deposition Method). These methods involve synthesizing in succession a number of glass particle deposited layers radially on the inner or outer wall of a starting material of cylindrical or columnar shape to form a predetermined radial refractive index distribution (also referred to as a refractive index profile) and to fabricate a glass preform for drawing. Herein, the optical fiber preform means a vitreous body having substantially the same refractive index distribution as the optical fiber, in which an outside cladding layer may be further provided by such as a VAD method, an OVD method or a rod-in collapse method.

However, to fabricate a preform for optical fiber having a complex refractive index profile structure in which there are a plurality of maximal points and minimal points in the refractive index profile, such as a dispersion compensating fiber, a dispersion shifted fiber, or a dispersion flatted dispersion shifted fiber, the above manufacturing method for optical fiber preform has a problem that the optical fiber preform may be difficult to produce at high yield because the refractive index profile has a little tolerance for excellent characteristics. Therefore, the preform for optical fiber with complex profile had a problem that the manufacturing cost may be high.

This invention has been achieved in the light of the above-mentioned problems, and it is an object of the invention to provide a manufacturing method for an optical fiber preform and a manufacturing method for an optical fiber in which the optical fiber with a complex refractive index profile is produced at high precision, and an optical fiber.

SUMMARY OF THE INVENTION

In order to achieve the above object, the invention of a first aspect provides a method for manufacturing an optical fiber preform comprising a central core portion having a maximal value Nc of refractive index in the center, and outside the central core portion, comprising at least a depressed portion having a minimal value Nd of refractive index, a ring portion having a maximal value Nr of refractive index and an outside cladding layer having a maximal value No of refractive index, the optical fiber preform satisfying a relation of Nc≧Nr>No>Nd among the values of refractive index, the method being characterized by comprising following steps: a glass rod fabrication step of fabricating a glass rod by inserting a core rod containing at least the central core portion into a depressed pipe containing at least the depressed portion and integrating them, a glass pipe fabrication step of fabricating a glass pipe having the ring portion, and an integration step of fabricating a vitreous body by integrating the glass rod and the glass pipe after inserting the glass rod into the glass pipe.

Herein, an optical fiber preform manufactured by the optical fiber preform manufacturing method is employed for an optical fiber having a complex refractive index profile, such as a dispersion shifted fiber, a dispersion flatted dispersion shifted fiber or a dispersion compensating fiber. In such a specialty fiber, the characteristics of the optical fiber are greatly changed if the diameter of the central core portion, radius ratios of each portion, relative refractive index difference of each portion, or the like are varied.

The optical fiber preform manufacturing method in the above way can manufacture the optical fiber preform at high precision because the glass rod containing the central core portion and the depressed portion each having the known refractive index profile is prepared, the glass pipe having the ring portion is prepared, and then the glass rod with the core and depressed portions is inserted into the glass pipe with the ring portion and integrated them (by rod-in-collapse).

The method for manufacturing the optical fiber preform according to the invention preferably includes a measuring step of measuring a radial and longitudinal refractive index profile of the glass rod, and a designing step of designing an outer diameter of the central core portion and a refractive index profile outside the central core portion based on a measurement result of the measuring step.

In addition, the method for manufacturing the optical fiber preform according to the invention is desirably characterized in that an ellipticity of the central core portion of the glass rod is 0.4% or less, and the number of voids arising on the integrating interface of the glass rod is equal to or less than one per 10 mm in length of the glass rod.

Herein, if the manufactured optical fiber preform has many voids, the core portion may be deformed or the optical fiber may be broken in drawing the optical fiber. In addition, if the ellipticity of the central core portion is above 0.4% in the glass rod, the ellipticity of the central core portion in the preform may become 1.5% or more, so that the PMD (Polarization Mode Dispersion) is deteriorated in the optical fiber.

In the method for manufacturing the optical fiber preform in the above way, the ellipticity of the central core portion in the glass rod and the number of voids on the integrating interface of the glass rod are reduced, whereby the optical fiber preform can be manufactured with desired characteristics in the drawn optical fiber.

In addition, in the method for manufacturing the optical fiber preform according to the invention, desirably the designating step is carried out by designing a ratio Ra of the outer diameter of the central core portion to the outer diameter of the depressed portion, a ratio Rb of the outer diameter of the depressed portion to the outer diameter of the ring portion, and a relative refractive index difference Δr of the ring portion to the outside cladding layer based on the measurement result of the measuring step.

In the method for manufacturing the optical fiber preform in the above way, the profile design of the optical fiber is made after one know the refractive index profile of the glass rod that is integration body of the central core portion and the depressed portion, whereby the drawn optical fiber can have the desired characteristics, thereby increasing the yield by eliminating the waste.

In addition, the method for manufacturing the optical fiber preform according to the invention is desirably characterized in that the glass rod fabrication step includes an intermediate rod fabricating sub-step of fabricating an intermediate product of the glass rod with a larger diameter of the depressed portion than a desirable diameter of the depressed portion, a Ra designing sub-step of deciding a desirable ratio Ra of an outer diameter of the central core portion to an outer diameter of the depressed portion based on a measurement result of a refractive index profile for the intermediate product of the glass rod, and a Ra adjusting step of removing an outer circumferential body of the intermediate product of the glass rod to adjust the designed ratio Ra to a designed value.

The ratio Ra has great influence on the characteristics of the drawn optical fiber. In the method for manufacturing the optical fiber preform in the above way, since the ratio Ra can be controlled precisely, the optical fiber having the desired characteristics is produced.

Herein, the methods for removing the outer circumferential body of the intermediate product of the glass rod produced in larger size include mechanical grinding, chemical etching, and/or thermal etching. In addition, there may be further provided a step of elongating the intermediate product of the glass rod or a step of elongating the glass rod with the value Ra adjusted to the designed value.

In addition, the method for manufacturing the optical fiber preform according to the invention is desirably characterized in that the glass pipe fabrication step includes a ring forming sub-step of forming the ring portion on an inner surface of a starting pipe by depositing a glass layer inside the starting pipe.

In the step of forming only the ring portion on the inner surface of the starting pipe, it is preferably employed that a glass layer is deposited inside the starting pipe. The glass pipe with a ring layer having desired refractive index and thickness of layer is produced at high precision, easily and in short time.

Herein, the methods for depositing the glass layer inside the starting pipe may include the MCVD method and the PCVD (plasma CVD) method.

In addition, the method for manufacturing the optical fiber preform according to the invention is desirably characterized in that the vitreous body integrated at the integration step has an ellipticity of 1.5% or less in the central core portion, and the number of voids arising on a integrating interface is equal to or less than one per 10 mm in length of the glass rod.

Herein, if many voids are contained on the integrating interface, the core may be deformed or broken when the fiber is drawn. In addition, if the ellipticity of the central core portion in the preform is above 1.5%, the PMD may be deteriorated in the fiber.

In the method for manufacturing the optical fiber preform in the above way, the optical fiber having desired characteristics is produced by removing the portion with voids on the integrating interface or large core ellipticity after visually inspecting the preform.

Assuming that a ratio of an outer diameter of the central core portion $2c$ to an outer diameter of the depressed portion $2d$ is Ra=$2c/2d$, a ratio of the outer diameter of the depressed portion $2d$ to an outer diameter of the ring portion $2r$ is Rb=$2d/2r$, a relative refractive index difference $\Delta c$ of the maximal refractive index of the central core portion Nc to the maximal refractive index of the outside cladding layer No is (Nc−No)/No×100[%], a relative refractive index difference $\Delta d$ of the minimal refractive index of the depressed portion Nd to the maximal refractive index of the outside cladding layer No is (Nd−No)/No×100[%], a relative refractive index difference $\Delta r$ of the maximal refractive index of the ring portion Nr to the maximal refractive index of the outside cladding layer No is (Nr−No)/No×100[%], and an outer diameter of the outside cladding layer is $2o$, the method for manufacturing the optical fiber preform according to the invention is desirably characterized in that the following relations are satisfied, 0.20≦Ra≦0.60
0.50≦Rb≦0.80
90 μm≦$2o$≦150 μm
2.5%≧$\Delta c$≧0.8%
−0.8%≦$\Delta d$≦−0.2% and
1.0%≧$\Delta r$≧0.1% and the fiber has a dispersion value at a wavelength of 1550 nm being +8 ps/km/nm or less.

In the method for manufacturing the optical fiber preform in the above way, it is possible to produce the optical fiber having excellent transmission characteristics suitable for such as the dispersion shifted fiber, dispersion flatted dispersion shifted fiber or dispersion compensating fiber, which have complex profiles.

In addition, in order to accomplish the above object, a method for manufacturing an optical fiber according to the invention includes a drawing step of drawing the optical fiber preform produced by a method including at least the above-mentioned steps.

Herein, since the desired characteristics may be changed with the relative refractive index difference $\Delta r$ or diameter of the ring portion $2r$, the diameter of the central core portion as the optical fiber is designed after knowing the profile of the produced ring portion. Then, the outside cladding layer is provided outside the vitreous body produced by the optical fiber preform manufacturing method, and the outer diameter of the outside cladding layer is decided so that the ratio of the diameter of core portion in the preform to the outer diameter of outside cladding layer is equivalent to the ratio of the core diameter to the outer diameter in the optical fiber which is produced by heating and drawing.

Accordingly, it is possible to manufacture precisely the optical fiber having a complex profile such as the dispersion shifted fiber, dispersion flatted dispersion shifted fiber, or dispersion compensating fiber, employing the method for manufacturing the optical fiber in the above way.

In addition, the optical fiber according to the invention is desirably produced by the above-mentioned optical fiber preform manufacturing method or the above-mentioned optical fiber manufacturing method.

The optical fiber in the above way may be employed as an optical fiber having a complex profile such as the dispersion shifted fiber, dispersion flatted dispersion shifted fiber, or dispersion compensating fiber.

In addition, in order to accomplish the above object, the invention of a second aspect provides a method for manufacturing an optical fiber preform comprising a central core portion having a maximal value Nc of refractive index in the center, and outside the central core portion, comprising at least a depressed portion having a minimal value Nd of refractive index, a ring portion having a maximal value Nr of refractive index and an outside cladding layer having a maximal value No of refractive index, the optical fiber preform satisfying a relation of Nc≧Nr>No>Nd among the values of refractive index, the method being characterized by comprising following steps: a glass rod fabrication step of fabricating a glass rod becoming the central core portion, a glass pipe fabrication step of fabricating a glass pipe by depositing a glass layer having at least one or more refractive indexes inside a starting pipe, and an integration step of fabricating a vitreous body by integrating the glass rod and the glass pipe after inserting the glass rod into the glass pipe.

In the optical fiber preform manufacturing method of the first aspect as already described, the glass rod is fabricated by integrating the core rod including at least the central core portion and the depressed pipe including at least the depressed portion so that it includes both of the central core portion and the depressed portion. In this optical fiber preform manufacturing method of the second aspect, the glass rod is fabricated from a core rod becoming at least the central core portion.

This optical fiber preform manufacturing method of the second aspect is based on the same concept as the optical fiber preform manufacturing method of the first aspect as already described, whereby the refractive index profile of the glass rod (that is, core glass rod) is measured, and the measurement result is fed back to the next step with the manufacturing conditions (thickness and refractive index of each layer) for the glass pipe (that is, outer core glass pipe). In the method for manufacturing the optical fiber preform, the glass rod becoming the central core portion and the glass pipe are produced at separate steps, and they are integrated by rod-in collapse to fabricate the vitreous body. At this time, the refractive index profiles of the glass rod and the glass pipe are measured, and the glass rod and the glass pipe each having suitable refractive index profile are chosen and combined to fabricate the vitreous body with the desired refractive index profile, whereby the optical fiber preform is produced precisely.

The method for manufacturing the optical fiber preform includes desirably a step of forming a jacket portion on the outside of the vitreous body to have an appropriate core diameter in the drawn optical fiber.

In addition, the method for manufacturing the optical fiber includes desirably a rod-in-drawing step of inserting the vitreous body into a jacket pipe and then drawing immediately after integrating the vitreous body and the jacket pipe. In this way, the steps of integrating the vitreous body and the jacket pipe and drawing are combined, whereby the cost for the optical fiber manufacturing process is reduced.

In addition, since there is no need for attaching the dummy rod used at the next step to both ends of the vitreous body, the working loss at both end portions of the vitreous body caused by fusing for attaching the dummy rod, is decreased, whereby the yield of the glass preform is improved.

Usually, when the vitreous body as the preform is formed by the MCVD method, there is an advantage that the refractive index profile is controlled minutely. However, it took more time to produce the vitreous body by the MCVD method than by the VAD method, the OVD method or the outside deposition method with multiple burners because the MCVD method generally has a low deposition rate. In the method for manufacturing the optical fiber preform, the ring layer required the precise profile control is separately formed minutely by the MCVD method, and the jacket portion is formed by high rate process, such as a VAD method, OVD method, or a rod-in collapse method. In this way, the vitreous body having a plurality of cladding layers with different refractive indexes is produced at low cost.

The method for manufacturing the optical fiber preform is desirably characterized in that the starting pipe is a silica glass pipe doped with at least fluorine.

With the conventional MCVD method, the starting pipe was the substantially pure silica pipe. For example, in fabricating a multilayer structure as shown in FIG. 12, the fluorine doped portion of the outer layer is conventionally synthesized by the MCVD method having low deposition rate. In this invention, the fluorine doped silica as the depressed portion on the outer circumference is employed as the starting pipe, and synthesized by the VAD method, the OVD method, or the outside deposition method with multiple burners to allow the fast glass synthesis, thereby remarkably increasing the productivity of the optical fiber.

In the method for manufacturing the optical fiber preform, the MCVD method is employed to deposit the glass layer inside the starting pipe, in which the deposition rate of depositing glass particles is preferably 0.4 g/min or more. The deposition rate of depositing glass particles is more preferably 1.0 g/min or more.

In the method for manufacturing the optical fiber preform, an induction furnace, a thermal plasma torch or an electric resistance furnace is preferably employed as a heating source in the MCVD method. These heating source are substantially hydrogen-free, and there is an advantage that much less OH-group is generated in the starting pipe by heating.

In the method for manufacturing the optical fiber preform, the ellipticity of the glass pipe in the inner diameter or outer diameter is preferably 1% or less, and the eccentricity ratio of the glass rod is preferably 1% or less.

In the optical fiber drawn from the preform fabricated by the at least one of the above methods, a PMD is preferably 0.15 ps/√(km) or less.

When the optical fiber is produced under the conditions that the ellipticity of the pipe in the inner diameter or outer diameter is 1.5%, or the eccentricity ratio of the pipe is 2%, the PMD is 0.5 ps/√(km) or more.

In the optical fiber drawn by the method for manufacturing the optical fiber, an excess absorption loss at a wavelength of 1.38 μm with OH group is preferably 0.2 dB/km or less.

The method for manufacturing an optical fiber preform according to the invention, further comprising a starting pipe fabrication step, in which silica glass particles are synthesized by a VAD method, an OVD method or an outside deposition method with multiple burners, and then dehydrated and consolidated to form the starting pipe, so that the residual OH group in the starting pipe is 0.001 wtppm or less.

BRIEF DESCRIPTION OF THE DRAWINGS

FIG. 3 are a flowchart showing the procedures of the optical fiber preform manufacturing method according to the invention.

FIG. 28 is a view showing an example of a refractive index profile of an optical fiber preform.

FIG. 29 is a view showing an example of a refractive index profile of an optical fiber preform.

In the figures, 10 is a central core portion, 11 is a depressed portion, 12 is a ring portion, 13 is an outside cladding layer, 14 is an optical fiber preform, 15 is an optical fiber, 16 is a glass rod (a glass rod with core and depressed portions), 17 is a glass pipe (a glass pipe with ring portion), 20 is a starting pipe (starting material), Nc is a maximal refractive index of the central core portion, Nd is a minimal refractive index of the depressed portion, and Nr is a maximal refractive index of the ring portion.

BEST MODE FOR CARRYING OUT THE INVENTION

The preferred embodiments of a manufacturing method for an optical fiber preform, a manufacturing method for an optical fiber, and an optical fiber according to the present invention will be described below in detail with reference to the accompanying drawings.

Figure 1:
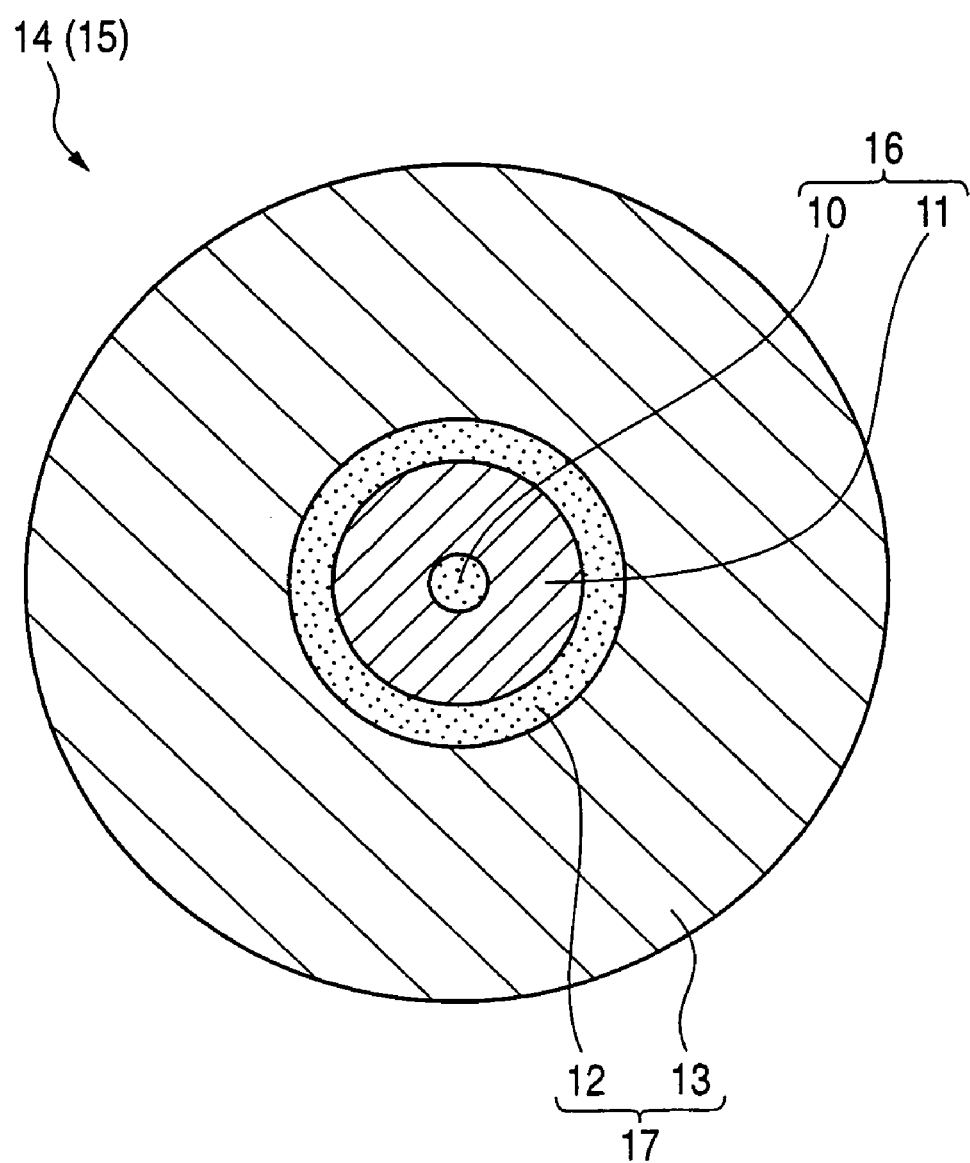
FIG. 1 is a cross-sectional view showing an optical fiber preform or an optical fiber that are manufactured respectively by an optical fiber preform manufacturing method or an optical fiber manufacturing method according to the present invention.

FIG. 1 is a cross-sectional view for explaining a manufacturing method for an optical fiber preform according to a first embodiment of the present invention. An optical fiber preform 14 comprises a central core portion 10, a depressed portion 11 located radially outside the central core portion 10, a ring portion 12 located radially outside the depressed portion 11, and an outside cladding layer 13 located radially outside the ring portion 12, as shown in FIG. 1. An optical fiber 15 drawn from the optical fiber preform has substantially the same cross-sectional view as in FIG. 1.

The central core portion 10 and the depressed portion 11 are formed as a glass rod 16 integrated by collapse. In addition, the ring portion 12 is formed as a part of a glass pipe 17 on inner surface of a starting pipe 13 by a CVD method. The optical fiber preform according to the invention is a combination of the central core portion 10, the depressed portion 11 and the ring portion 12, which are fabricated separately. A procedure for combining the central core portion 10, the depressed portion 11 and the ring portion 12 will be described later.

In this invention, it is supposed that the maximal refractive index of the central core portion 10 is Nc, the minimal refractive index of the depressed portion 11 is Nd, the maximal refractive index of the ring portion 12 is Nr, and the maximal refractive index of the outside cladding layer 13 is No. In addition, there is a relation Nc≧Nr>No>Nd among these refractive indexes. That is, the invention treats the optical fibers of complex profile, such as a dispersion shifted fiber, a dispersion flatted dispersion shifted fiber, and a dispersion compensating fiber.

Figure 2:
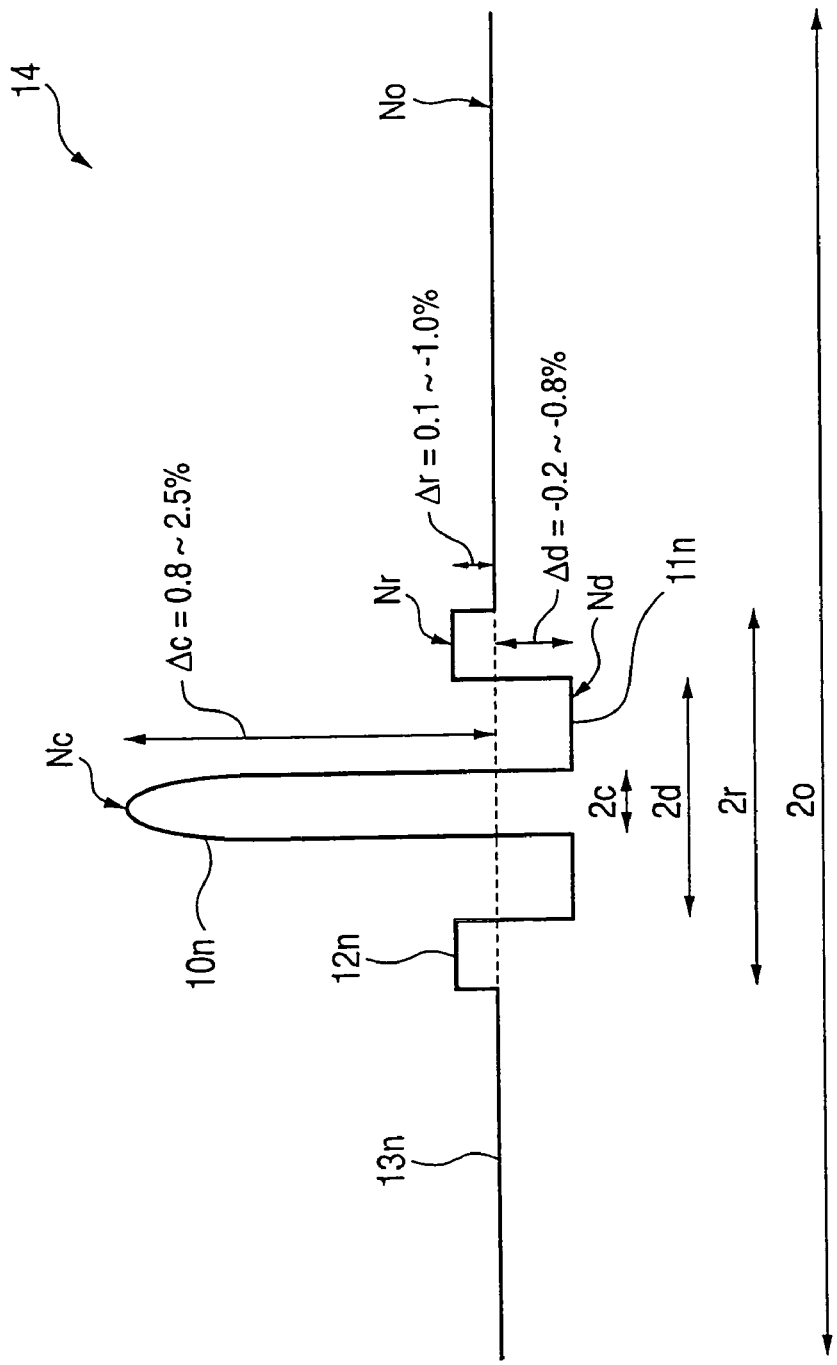
FIG. 2 is a graph showing the diameter of each portion and the relative refractive index difference of each portion in the optical fiber preform or the optical fiber.

FIG. 2 shows a refractive index profile of the optical fiber preform (or optical fiber 15). In the refractive index profile as shown in FIG. 2, 10n corresponds to an area of the central core portion, 11n corresponds to an area of the depressed portion, 12n corresponds to an area of the ring portion, and 13n corresponds to an area of the outside cladding layer. In addition, in the refractive index profile as shown in FIG. 2, Nc corresponds to the maximal refractive index of the central core portion, Nd corresponds to the minimal refractive index of the depressed portion, Nr corresponds to the maximal refractive index of the ring portion, and No corresponds to the maximal refractive index of the outside cladding layer.

Moreover, 2c indicates the outer diameter of the central core portion, 2d indicates the outer diameter of the depressed portion, 2r indicates the outer diameter of the ring portion, and 2o indicates the outer diameter of the outside cladding layer, in FIG. 2. In addition, with reference to the refractive index of the outside cladding layer, the relative refractive index difference of the central core portion is denoted by Δc, the relative refractive index difference of the depressed portion is denoted by Δd, and the relative refractive index difference of the ring portion is denoted by Δr respectively.

In the optical fiber preform of this embodiment, Δc is set to 0.8 to 2.5%, Δd is set to −0.2 to −0.8%, and Δr is set to 0.1 to 1.0%.

FIGS. 3(a) to 3(c) show a procedure for combining the central core portion 10, the depressed portion 11, and the ring portion 12 formed in an inner surface of the outside cladding layer 13 in the optical fiber preform 14 as shown in FIG. 1. FIG. 3(a) shows a glass rod having the depressed portion and the central core portion. Herein, 30 denotes a range of an area corresponding to the central core portion, and 31 denotes a range of an area corresponding to the depressed portion. The glass rod is produced to have a refractive index profile in the range 36 as shown in FIG. 3(a).

FIG. 3(b) shows a glass pipe containing the ring portion formed on the inner circumferential surface of the outside cladding layer by such as MCVD method or PCVD method. In FIG. 3(b), 32 denotes a range of an area corresponding to the ring portion 12 (see FIG. 1), and 33 denotes a range of an area corresponding to the outside cladding portion 13 (see FIG. 1). The glass pipe is produced to have the refractive index profile in a range 37 by combining the outside cladding layer and the ring portion, as shown in FIG. 3(b).

FIG. 3(c) shows a refractive index profile of the vitreous body when the glass rod having the refractive index profile as shown in FIG. 3(a) and the glass pipe having the refractive index profile as shown in FIG. 3(b) are integrated by collapse to form the vitreous body. That is, the refractive index profile of vitreous body as indicated in a range 38 has a combined shape of the refractive index profile of glass rod as indicated in a range 36 of FIG. 3(a) and the refractive index profile index of glass pipe as indicated in the range 37 of FIG. 3(b).

In this invention, the central core portion, the depressed portion, and the ring portion are fabricated through separate processes and combined. For example, the central core portion and the depressed portion composing the glass rod may be produced separately, as will be described later.

Figure 4:
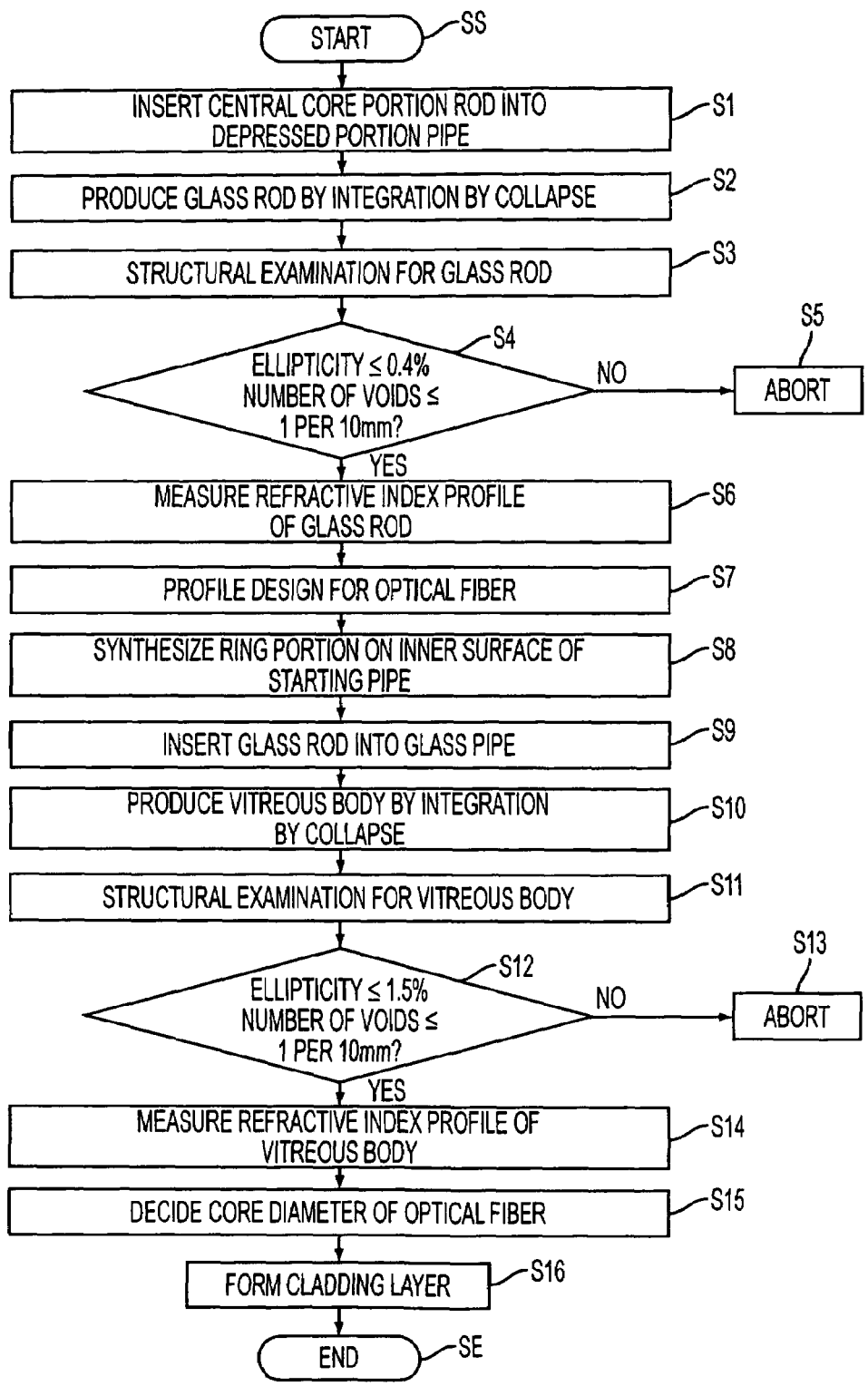
FIG. 4 is an explanatory view for explaining a process for producing a vitreous body by inserting a glass rod into a glass pipe and then integrating them.

Referring to FIG. 4, a manufacturing process will be described in detail.

Figure 5:
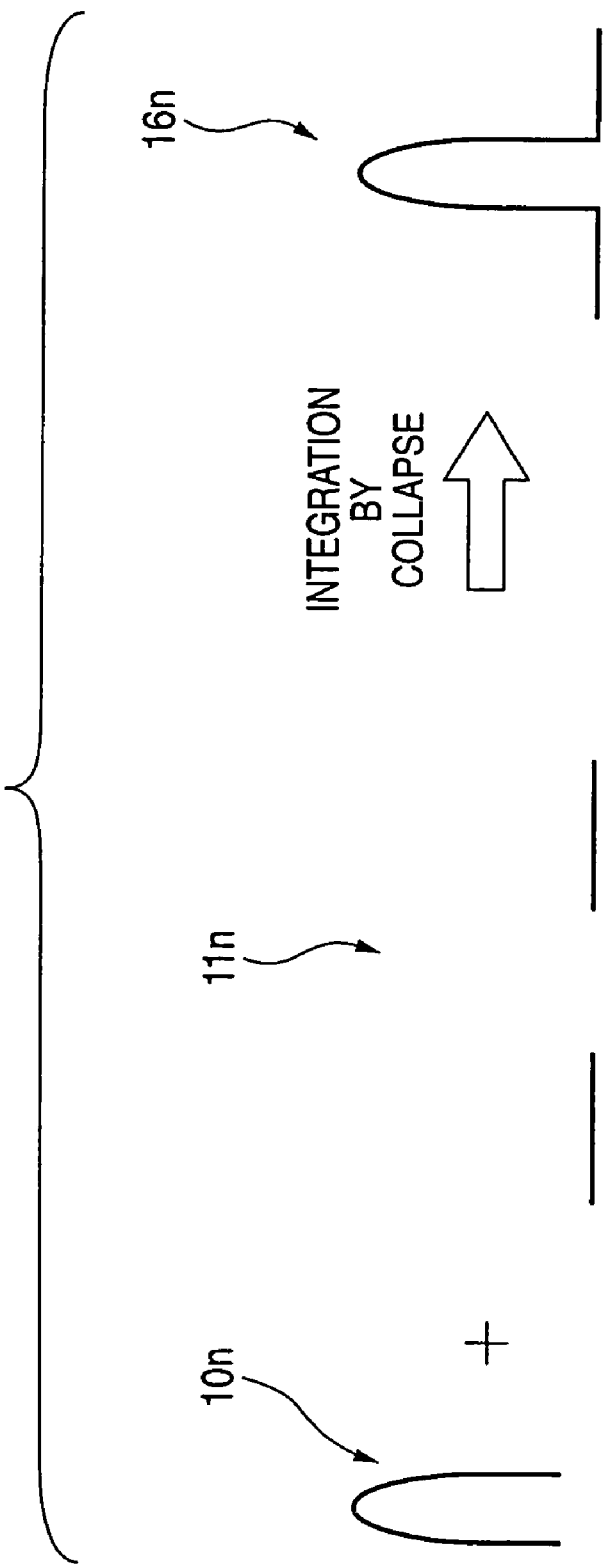
FIG. 5 is an explanatory view for explaining a process for producing a glass rod by inserting a core rod into a depressed pipe and integrating them.

After starting the manufacturing process (step SS), the glass rod fabrication step for fabricating the glass rod is performed. A procedure for the glass rod fabrication step is shown in FIG. 5. As shown in FIGS. 4 and 5, in fabricating the glass rod, a core rod serving as the central core portion having the refractive index profile 10n is inserted into a depressed pipe serving as the depressed portion having the refractive index profile 11n (step S1). Then, the core rod and the depressed pipe are integrated by rod-in collapse to produce the glass rod (step S2). The refractive index profile of this glass rod has a shape of the refractive index profile 16n because the refractive index profile 10n and the refractive index profile 11n are combined.

In the glass rod fabrication step, by employing the core rod and depressed pipe each having the known refractive index profile, a desired glass rod 16 (see FIG. 1) is securely obtained. In other words, core rod and the depressed pipe each having the refractive index profiles which have been already measured and known are appropriately selected and combined in accordance with the optical fiber profile of interest.

In the manufacturing method for the optical fiber preform according to the embodiment as shown in FIG. 4, the glass rod fabricated in the glass rod fabrication step is subjected to a visual inspection and a measurement of ellipticity of the central core portion as the structure inspection (step S3). If the number of voids in a length direction of the glass rod residing on the integrating interface is greater than a predetermined number (here, one per 10 mm) and the ellipticity in an area which becomes the central core portion is greater than a predetermined value (here, 0.4%) (step S4), the glass rod is not employed as a conforming product because defects may occur at the later stages (step S5).

Figure 6:
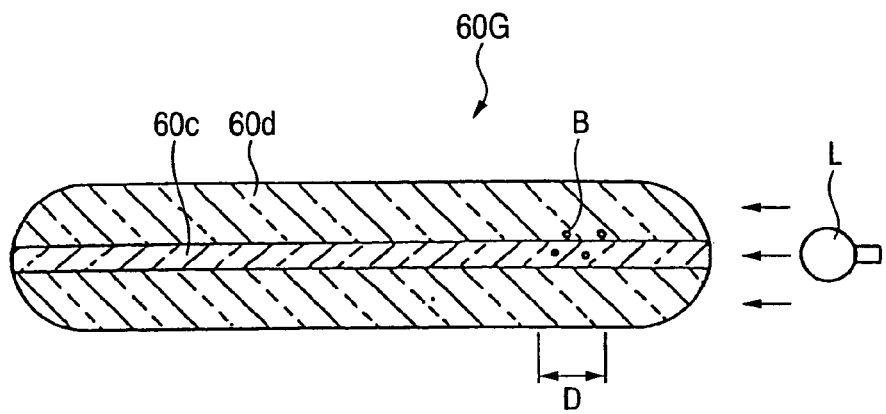
FIG. 6 is a view for explaining the measurement of voids residing on a integrating interface of the glass rod.

FIG. 6 is a view for explaining a method for measuring voids occurring on the interface in integrating the glass rod.

In the glass rod 60G as shown in FIG. 6, 60c denotes an area that becomes the central core portion, and 60d denotes an area that becomes the depressed portion. The glass rod 60G is illuminated from one direction, using a light source L such as a halogen lamp. Then, the number of voids B residing on the interface between the area 60c and the area 60d is visually measured. When there are voids B at one or more per 10 mm in the longitudinal direction of the glass rod 60G, an area D where the voids B reside is abandoned.

Figure 7:
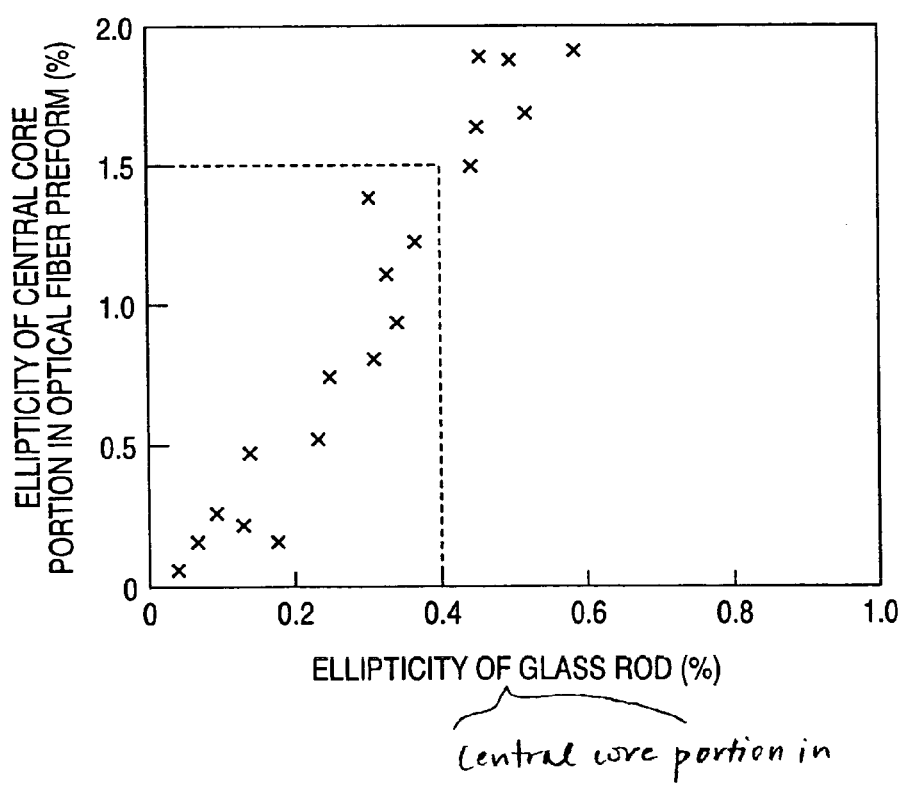
FIG. 7 is a graph showing the relationship between the ellipticity of the central core portion in the glass rod and that in the optical fiber preform.

FIG. 7 is a graph showing the relationship between the ellipticity (%) of central core portion in glass rod and the ellipticity (%) of central core portion in optical fiber preform. As shown in FIG. 7, there is a high possibility that the glass rod having ellipticity of central core portion beyond 0.4% becomes the optical fiber preform having ellipticity of central core portion beyond 1.5% at the later stage. Therefore, the glass rod having ellipticity of central core portion of 0.4% or less is only employed as a conforming product in the above step, whereby the optical fiber with excellent PMD can be manufactured in a high yield.

Herein, the ellipticity is obtained in accordance with the expression $$Ellipticity = (Rmax - Rmin)/Rmax \times 100 \ (\%)$$

when the outer circumference of cross section is approximated by ellipse, where Rmax is the maximum diameter and Rmin the minimum diameter.

That is, if the ellipticity is higher, the PMD in the drawn optical fiber is increased, deteriorating the quality of transmission signal. In addition, if more voids are contained on the integrating interface, voids expand to block the central core portion at the later heating step such as drawing step, thereby increasing the transmission loss of signal light or guiding no wave. In addition, the mechanical strength is decreased in the region where many voids reside.

In addition, in the optical fiber preform manufacturing method according to this embodiment as shown in FIG. 4, the refractive index profile of the glass rod fabricated at the glass rod fabrication step is measured (step S6). To obtain desired characteristics in the drawn optical fiber, the ratio Ra of the diameter (2c) of the central core portion to the diameter (2d) of the depressed portion (here, Ra=2c/2d), and the refractive index profile outside the depressed portion (on the side of the ring portion) are calculated and designed (step S7) based on the refractive index profiles of the central core portion and the depressed portion as clarified by the measurement.

In this way, since the profile of the optical fiber is designed based on the refractive index profile obtained at the intermediate stage in the optical fiber manufacturing process, the desired optical fiber preform is produced at higher precision than when the profile of optical fiber is designed at first and then the optical fiber is produced collectively based on this design.

Figure 8:
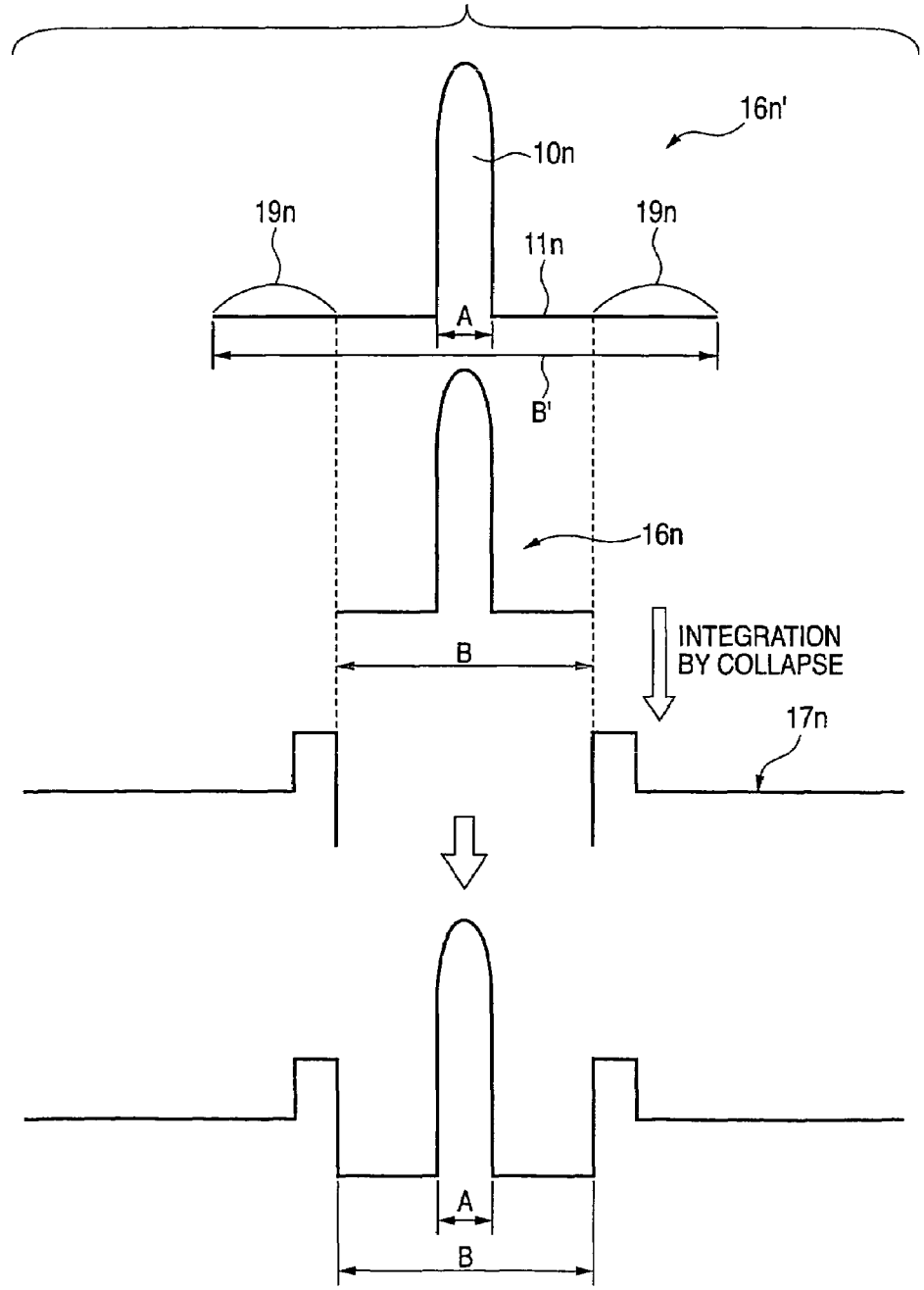
FIG. 8 is an explanatory view for explaining a procedure for adjusting a ratio Ra to the designed value and integrating the glass rod to the vitreous body.

FIG. 8 shows a procedure for designing the glass rod based on the ratio Ra, and integrating it with the glass pipe by collapse. As can be clear from the refractive index profile of FIG. 8, the central core portion composing the refractive index profile 10n and the depressed portion composing the refractive index profile 11n are integrated, whereby the intermediate product of the glass rod (a portion composing the refractive index profile 16n' in FIG. 8) having the depressed position diameter B' is produced. At this time, it is supposed that the diameter B' is larger than the diameter B. That is, the intermediate product 16n' of the glass rod is designed to have the ratio (2c/2d') of the diameter of central core portion to the diameter of depressed portion to be smaller than the desired glass rod (portion composing the refractive index profile 16n' 16n). The outer diameter of the depressed portion is adjusted by removing an unneeded part (portion on the extension line at both ends in the preform diameter direction of the refractive index profile 11n) as indicated by 19n in the figure in accordance with the glass pipe with the refractive index profile 17n. In other words, the intermediate product 16n' of the glass rod is adjusted by deciding the desirable ratio Ra (2c/2d) based on the result of measuring the refractive index profile, and removing its outer circumferential body to obtain the ratio Ra.

To remove the unneeded part 19, there are methods of 1) removing all at once, 2) partially removing, then elongating, and then further removing, and 3) elongating and then removing the unneeded part 19n. In this invention, any of the removal methods may be employed. Removing means may include mechanical grinding and etching in the HF solution.

Figure 9:
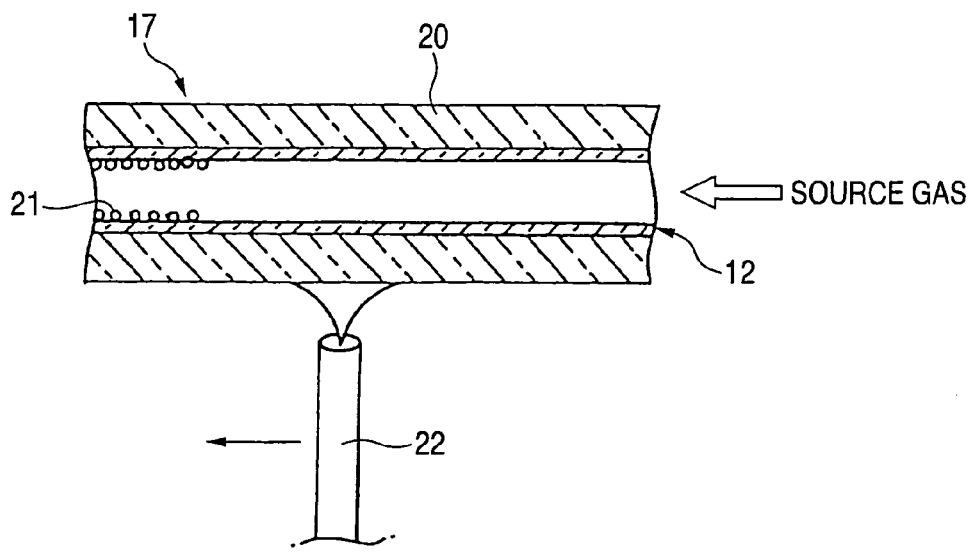
FIG. 9 is an explanatory view showing a state in which a ring portion is formed on the inner surface of a starting pipe.

On the other hand, in the glass pipe fabrication step, the desired glass pipe 17 (see FIG. 1) is produced, employing the CVD method inside a pipe such as MCVD or PCVD method, for example, as shown in FIG. 9. As for an MCVD method, the source gases ($SiCl_4$, $GeCl_4$, oxygen) and helium are introduced into the starting pipe 20 while the outside of the starting pipe is heated by a heating source 22, whereby glass particles (soot) 21 are deposited to form the ring portion 12 (step S8). Thereby, the glass pipe 17 having the ring portion 12 with the refractive index and thickness according to the design is produced at high precision and in short time.

With the manufacturing method for the optical fiber preform according to the embodiment as shown in FIG. 4, the glass rod is inserted into the glass pipe (step S9), integrated by collapse (step S10) to produce the vitreous body. This vitreous body is subjected to the structure inspection (visual inspection and core ellipticity measurement) (step S11). Then, if the number of voids occurring on the integrating interface is greater than a predetermined number (here, one per 10 mm) and the ellipticity of the area becoming the central core portion is greater than a predetermined value (here, 1.5%) (step S12), the vitreous body is not employed as a conforming product because defects may occur at the later stages (step S13).

Figure 10:
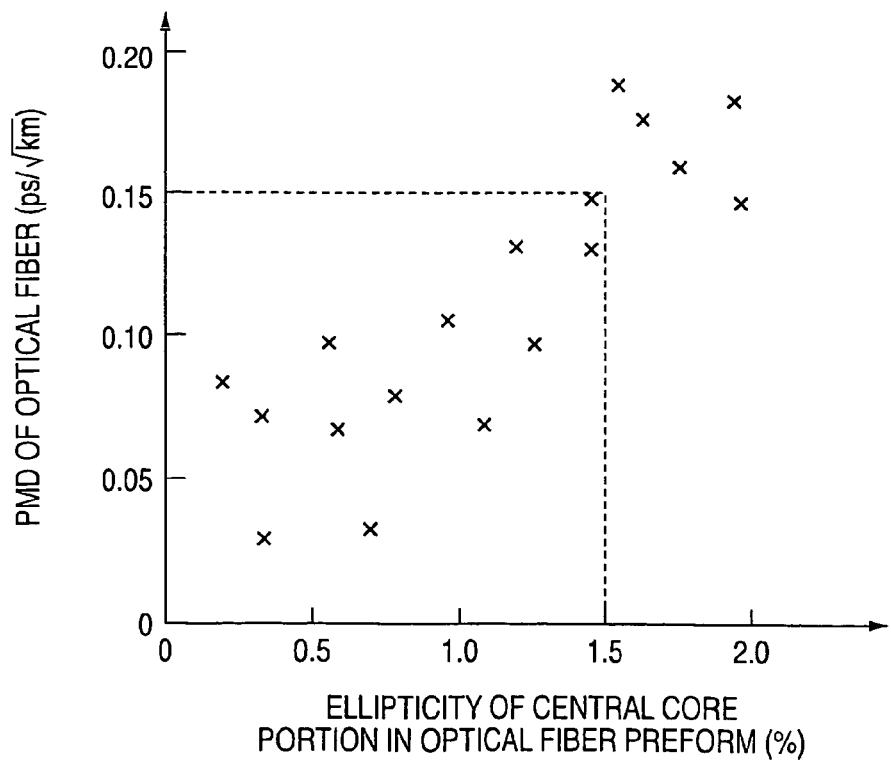
FIG. 10 is a graph showing the relationship between the ellipticity of the central core portion in the optical fiber preform and the PMD of optical fiber.

FIG. 10 is a graph showing the relationship between the ellipticity (%) of the central core portion in optical fiber preform and the PMD of optical fiber. As shown in FIG. 10, the optical fiber preform having ellipticity of central core portion beyond 1.5% has an extremely high possibility that the PMD of optical fiber obtained after the drawing step exceeds the 0.15 ps/$\sqrt{(km)}$. In general, the optical fiber with 0.15 ps/$\sqrt{(km)}$ or less is required for the high speed optical communications at 40 Gb/s or more. That is, employing only the optical fiber preform having ellipticity of central core portion of 1.5% or less as in the above step, the optical fiber having excellent PMD is manufactured efficiently, which is applicable to the high speed optical communications.

On the other hand, at step S12, if the number of voids on the integrating interface is less than or equal to a predetermined number, and the ellipticity of the area becoming the central core portion is less than or equal to a predetermined value, the procedure goes to step S14. Herein, the refractive index profile of vitreous body is measured (step S14), and the diameter of central core portion is calculated and decided based on the measurement result (step S15). Herein, the outside cladding layer is provided so that the ratio of the diameter of central core portion to the diameter of preform is equivalent to the ratio of the diameter of core portion to the outer diameter in the drawn optical fiber (step S16).

Though not shown in the flowchart of FIG. 4, the optical fiber preform as produced in the above way is drawn to manufacture the optical fiber.

In the optical fiber preform 14 (see FIG. 1) as produced in the above way, providing that the ratio of the outer diameter of central core portion 2c to the outer diameter of depressed portion 2d is Ra=2c/2d, the ratio of the outer diameter of depressed portion 2d to the outer diameter of ring portion 2r is Rb=2d/2r, the relative refractive index difference $\Delta c$ of the central core portion to the outside cladding layer is (Nc−No)/No×100[%], the relative refractive index difference $\Delta d$ of the depressed portion to the outside cladding layer is (Nd−No)/No×100[%], the relative refractive index difference $\Delta r$ of the ring portion to the outside cladding layer is (Nr−No)/No×100[%], and the outer diameter of the outside cladding layer is 2o, the relations (1) $0.20 \leq Ra \leq 0.60$, (2) $0.50 \leq Rb \leq 0.80$, (3) $90 \mu m \leq 2o \leq 150 \mu m$, (4) $2.5\% \geq \Delta c \geq 0.8\%$, (5) $-0.8\% \leq \Delta d \leq -0.2\%$, and (6) $1.0\% \geq \Delta r \geq 0.1\%$ are satisfied, in which it is desirable that the fiber has the dispersion value at a wavelength of 1550 nm being less than or equal to +8 ps/km/nm.

The optical fiber preform manufacturing method, the optical fiber manufacturing method and the optical fiber as described above, can manufacture the optical fiber preform with complex profile and the optical fiber at high precision because the glass rod comprising the central core portion and the depressed portion each having known refractive index profile is fabricated, the glass pipe having the ring portion is fabricated, and then the glass rod is inserted into the glass pipe and integrated them by rod-in collapse to produce the vitreous body.

In the conventional optical fiber preform, the central core portion, the depressed portion and the ring portion are fabricated integrally through one process at one process by such as the MCVD method, the VAD method or the OVD method. Therefore, it is difficult to add the dopant such as Ge or F (fluorine) especially F, to respective portions selectively. However, in the optical fiber preform of this embodiment, since the central core portion, the depressed portion and the ring portion are fabricated separately, an optical fiber preform having multiple layers respectively doped with such as Ge or F (fluorine) selectively can be easily fabricated.

More specifically, when the central core portion, the depressed portion and the ring portion are fabricated collectively through one process, a coexistent part of Ge and F arises. In this part, glass defect is formed by heating, such as $GeO_2 + F \rightarrow GeO_n F_m$, whereby the transmission loss is increased.

Accordingly, with the manufacturing method of the invention, since dopant is added to the central core portion, the depressed portion and the ring portion separately, there is almost no coexistent part of Ge and F, whereby the increased transmission loss of optical fiber is reduced.

In addition, with the manufacturing method for the optical fiber preform according to the invention, since the ring portion is only fabricated by the CVD method inside a pipe, there is no ripple intrinsic to the CVD method or no dip in the central part except for the ring portion. Herein, FIG.

11(a) shows a refractive index profile of the optical fiber produced by the optical fiber preform manufacturing method (or optical fiber manufacturing method) according to the invention. In addition, FIG. 11(b) shows a refractive index profile of the optical fiber produced by fabricating collectively the central core portion, the depressed portion and the ring portion by the MCVD method.

Figure 11:
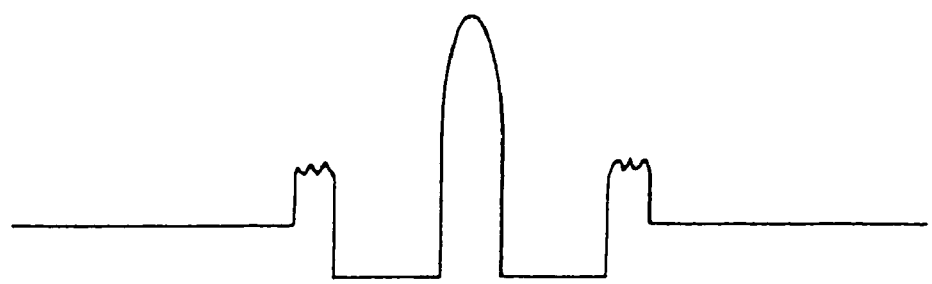
FIG. 11(a) is a chart showing a refractive index profile of the optical fiber produced according to the invention and FIG. 11(b) is a chart showing a refractive index profile of the optical fiber produced by synthesizing the central core portion, the depressed portion and the ring portion by an MCVD, or PCVD method.
Figure 11:
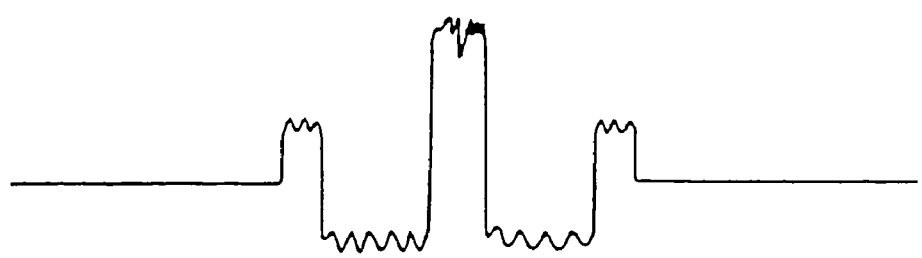

In the refractive index profile as shown in FIG. 11(a), ripple is confirmed only in the ring portion, but no ripple or dip was formed in the central core portion and the depressed portion. On the other hand, in the refractive index profile as shown in FIG. 11(b), ripple was found over the central core portion, the depressed portion, and the ring portion, and dip was formed in the central core portion.

A manufacturing method for an optical fiber preform according to a second embodiment of the invention will be described below.

Figure 12:
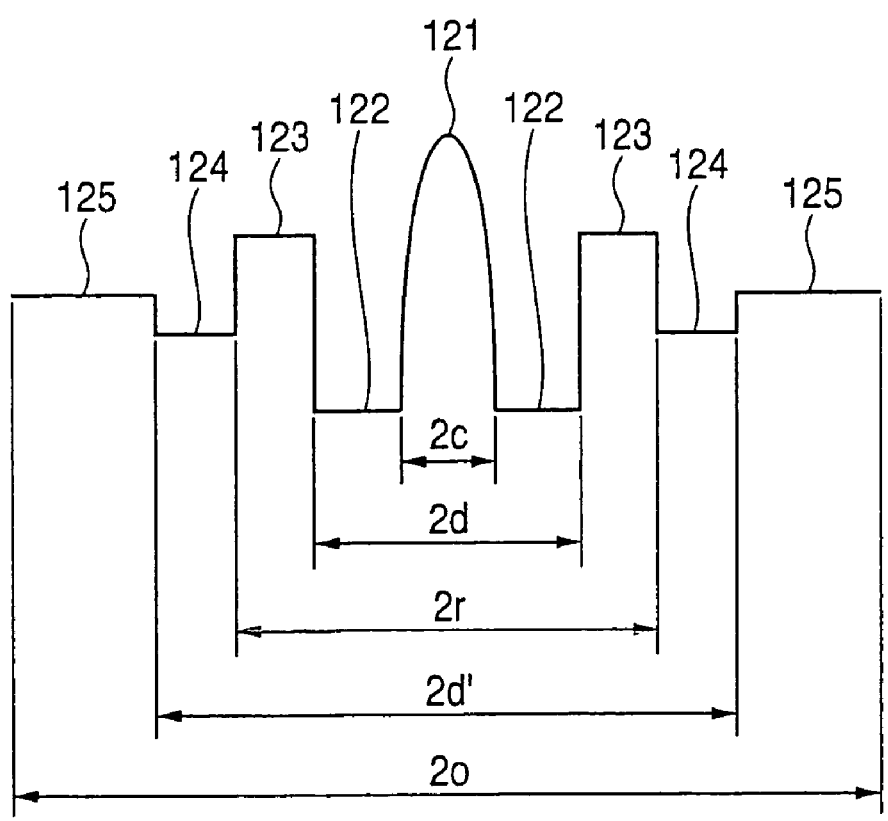
FIG. 12 is a view showing a refractive index profile of an optical fiber preform according to a second embodiment.
Figure 13:
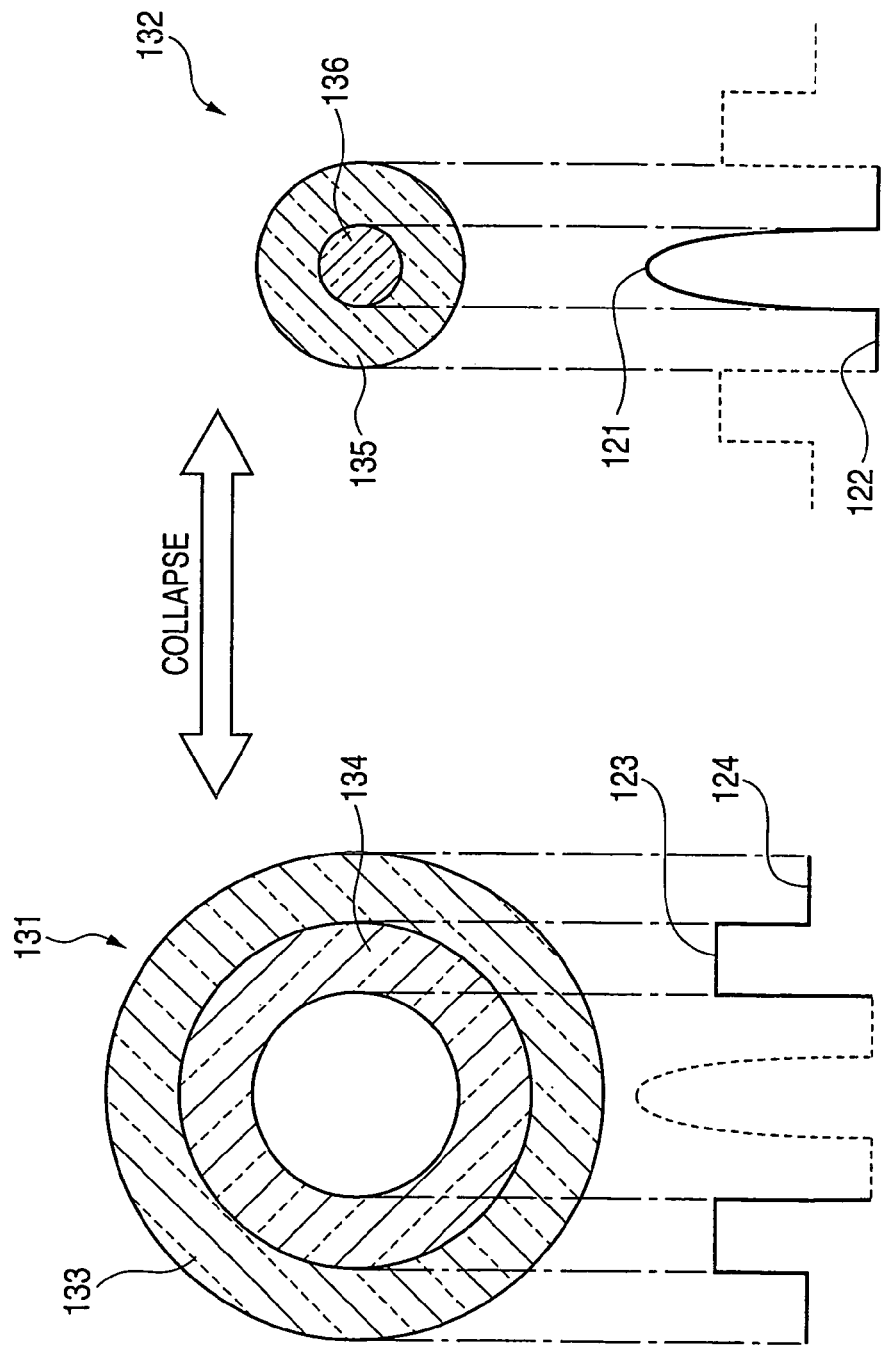
FIG. 13(a) is a view for explaining a process for manufacturing a glass pipe according to the second embodiment.
FIG. 13(b) is a view for explaining a process for manufacturing a glass rod according to the second embodiment.
Figure 14:
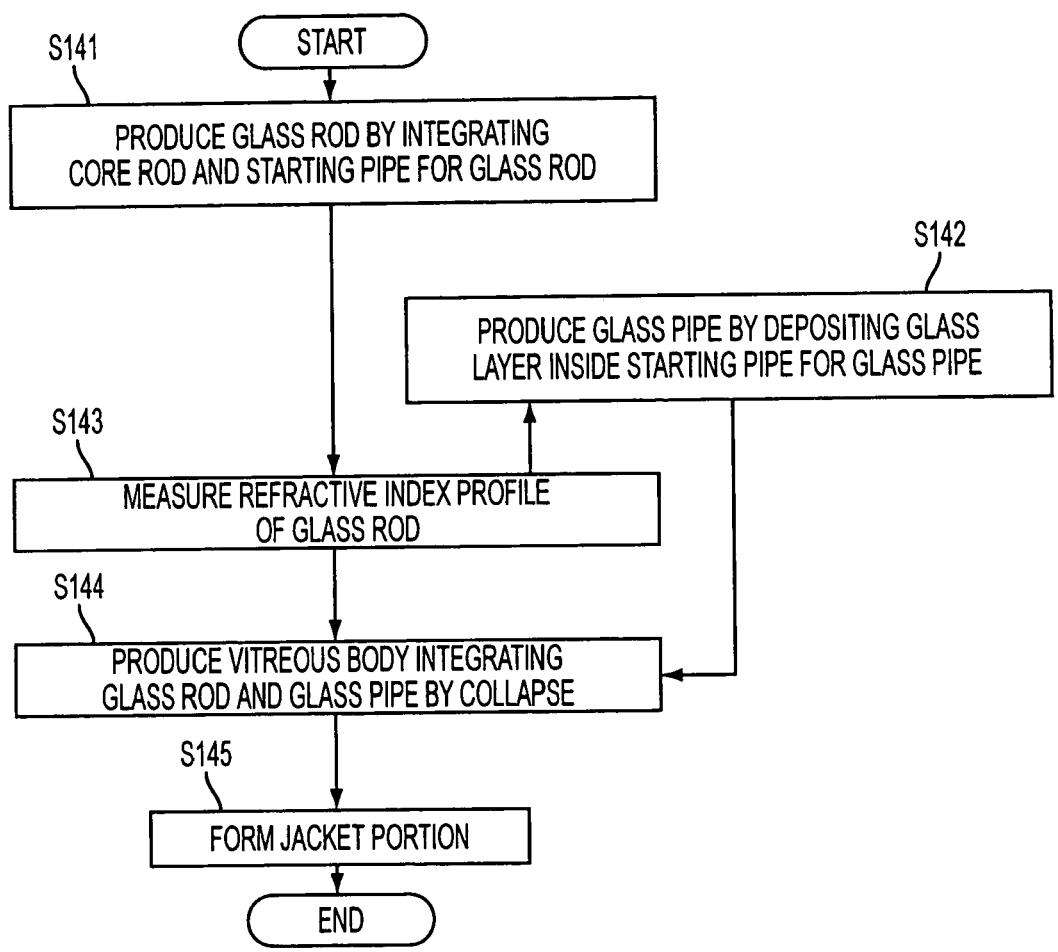
FIG. 14 is a flowchart for explaining a process for manufacturing an optical fiber preform according to the second embodiment.

FIG. 12 shows a refractive index profile of the optical fiber preform according to this embodiment. FIG. 13 is a view for explaining a process for manufacturing the optical fiber preform according to this embodiment, in which FIG. 13(a) is a view for explaining a process for manufacturing a glass pipe, and FIG. 13(b) is a view for explaining a process for manufacturing a glass rod. FIG. 14 is a flowchart for explaining a process for manufacturing the optical fiber preform according to this embodiment.

Supposing that the refractive index of a central core portion 121 is Nc, the refractive index of a first depressed portion 122 is Nd1, the refractive index of a ring portion 123 is Nr, the refractive index of a second depressed portion 124 is Nd2, and the refractive index of an outside cladding layer 125 is No, there is a relation $Nc \geq Nr > No > Nd2 \geq Nd1$, as shown in FIG. 12. Herein, since the refractive indexes Nd1 and Nd2 are smaller than the refractive index No of the outside cladding layer 125, the refractive indexes Nd1 and Nd2 may be assumed as the refractive index Nd. That is, there is a relation $Nc \geq Nr > No > Nd$ among these refractive indexes in this embodiment.

Referring to FIGS. 13 and 14, a manufacturing method for the optical fiber preform according to the embodiment will be described below. As shown in FIGS. 13 and 14, first of all, a glass rod fabrication step of fabricating a glass rod 132 by integrating a core rod 136 and a glass pipe 135 by collapse is performed (step S141). Then, a glass pipe 131 fabrication step is performed at step S142 as a different step from the glass rod fabrication step. In the glass pipe 131 fabrication step, glass layers 134 forming the ring portion 123 are deposited inside a starting pipe 133 forming the second depressed portion 124.

Herein, the glass pipe fabrication step may be performed before, during, or after the glass rod fabrication step.

The refractive index profile (refractive index, thickness of layer and outer diameter for each layer having different refractive index) of the glass rod 132 is measured employing a preform analyzer (step S143), and the measurement result is fed back to the fabrication step of the glass pipe 131 at step S142 to design the glass pipe 131. Herein, the design involves calculating the fabrication conditions (thickness and refractive index of each layer) of glass pipe. After the glass rod fabrication step and the glass pipe fabrication step, the glass rod 132 is inserted into the glass pipe 131 and integrated to produce a vitreous body (step S144) by rod-in collapse. Thus, the vitreous body is obtained.

In this embodiment, it is possible that the refractive index and thickness of layer of the glass pipe 131 may be measured, and the measurement result may be fed back to the fabrication step of the glass rod 132 at step S141 to design the glass rod 132.

To fabricate the fiber having the desired core diameter and the diameter of the drawn fiber and having the desired characteristics, glass particles may be deposited and consolidated on the outside of the vitreous body by the outside deposition method employing multiple burners to form a jacket portion. In this case, the jacket portion is used to adjust the core diameter of the fiber. Because little light passing through optical fiber leaks into the jacket portion, the optical characteristics such as transmission loss are hardly affected even by applying the above process for synthesizing the glass at high speed to form the jacket portion. Therefore, the large optical fiber preform is produced at low cost, and the optical fiber is produced at low cost.

Figure 15:
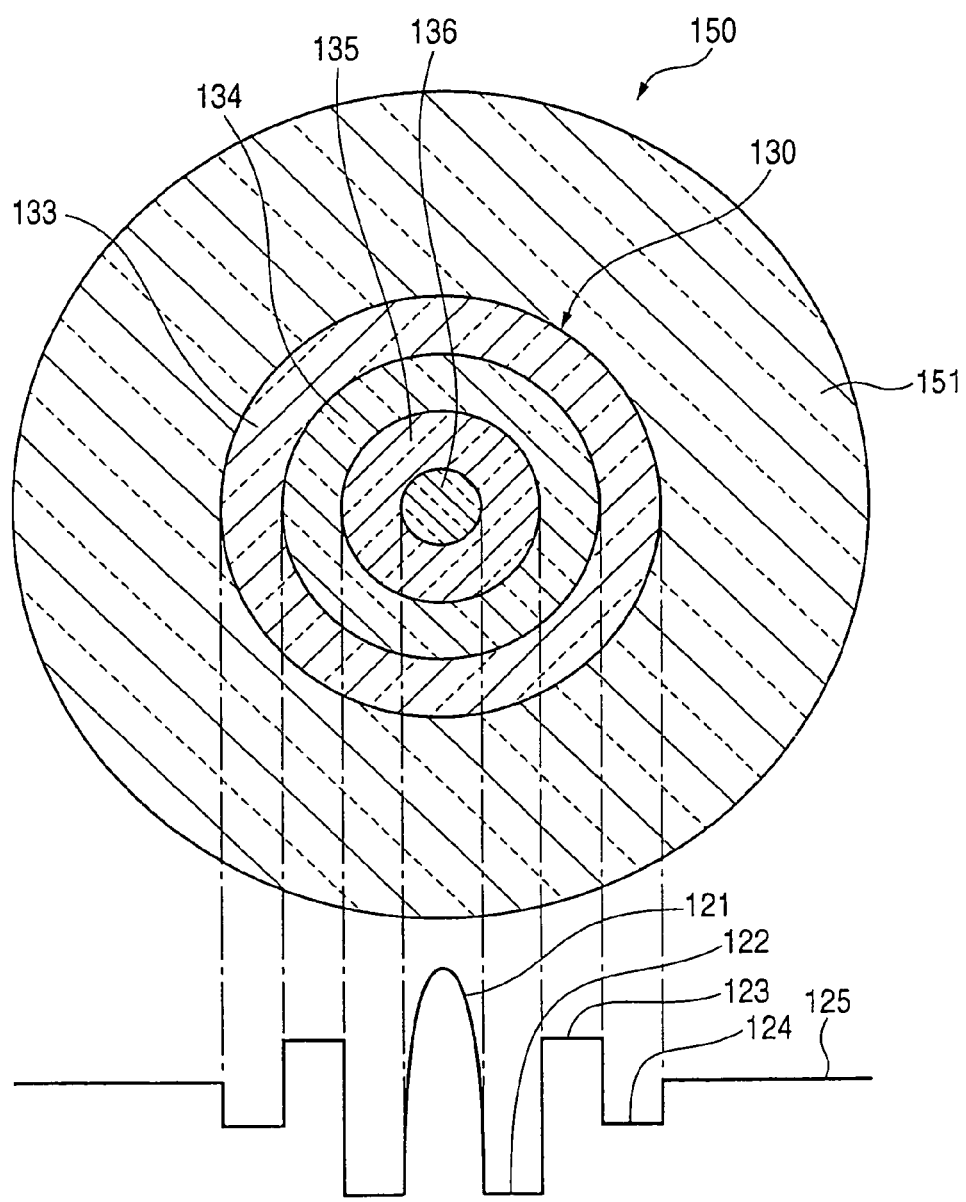
FIG. 15 is a cross-sectional view showing the optical fiber preform according to the second embodiment.

FIG. 15 shows a cross-section of the optical fiber preform formed with the jacket portion. As shown in FIG. 15, an optical fiber preform 150 is provided with a jacket portion 151 around the outer circumference of the vitreous body 130 obtained.

Herein, instead of providing the jacket portion 151 around the outer circumference of the vitreous body 130, a silica pipe, which is fabricated by depositing and consolidating glass particles by an OVD method and piercing the hole by the piercing method as will be described later, may be prepared as the jacket pipe. Then, the vitreous body is inserted into this jacket pipe, the jacket pipe and the vitreous body 130 is integrated, and immediately drawn by heating.

Figure 16:
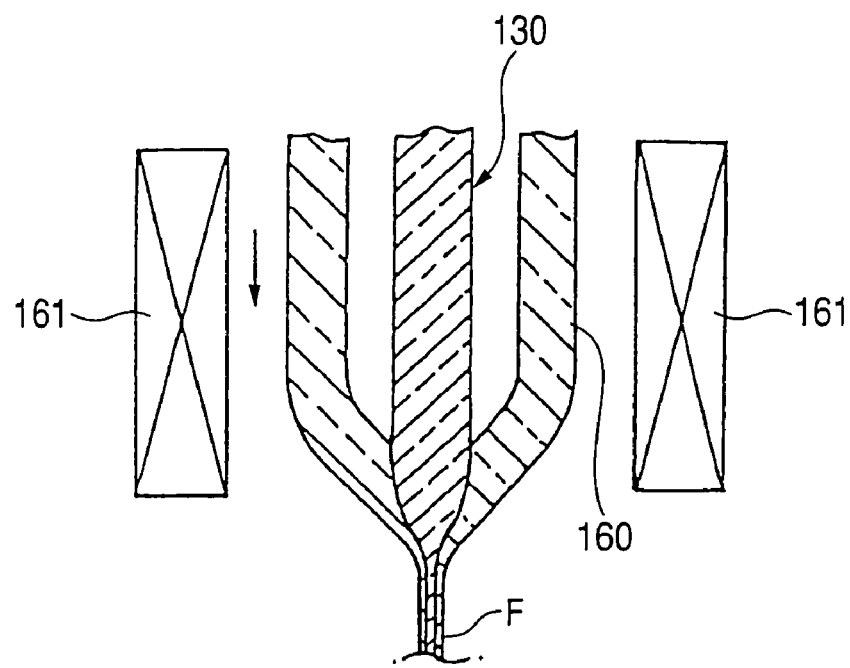
FIG. 16 is an explanatory view showing a process for inserting a vitreous body into a jacket pipe, and drawing it into optical fiber.

FIG. 16 is an explanatory view showing a process for inserting the vitreous body into the jacket pipe and drawing them. Referring to FIG. 16, this process will be described below. As shown in FIG. 16, the vitreous body 130 inserted into a cylindrical jacket pipe 160 is heated by heating source 161 such as a heater, furnace or burner. The heating source 161 may be disposed outside the vitreous body 130 and the jacket pipe 160, the vitreous body 130 and the jacket pipe 160 are set along the heater. A lower end side (lower portion in FIG. 16) of the heater is set to have a higher temperature than an upper end side (upper portion in FIG. 16). Thereafter, the lower end portions of the vitreous body 130 and the jacket pipe 160 are integrated by heating, and fused to draw the optical fiber F downwards. In addition, the vitreous body 130 and the jacket pipe 160 are fed in a direction of the arrow during the drawing as shown in FIG. 16. Though the heater generates heat by flowing electric current through a resistor in FIG. 16, the heater may alternatively be an induction furnace for heating by an induced current caused by guiding electric current to the reactance, or a heating source using a plasma. The heating means 161 may have a plurality of heaters arranged in the axial direction (upper and lower directions in FIG. 16) of the vitreous body 130.

In this way, the process for forming the jacket portion may be omitted by performing the process for inserting the vitreous body into the jacket pipe and drawing them.

Figure 17:
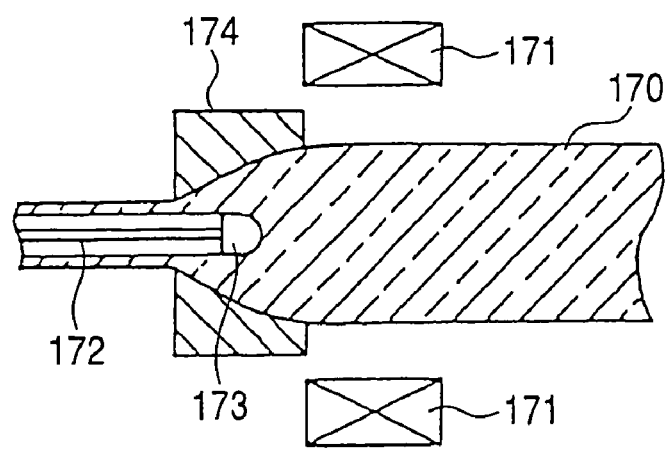
FIG. 17 is a view for explaining a process for manufacturing a pipe by a piercing method.

A process for fabricating the pipe such as the starting pipe will be now described. In this process, a so-called piercing method is employed. FIG. 17 is a view for explaining a process for fabricating the pipe by the piercing method.

In this process, a columnar silica glass rod 170 is inserted into the inside of heating means 171 disposed to the silica glass rod, and one end portion of the silica glass rod 170 (left end portion in FIG. 17) is heated and fused, as shown in FIG. 17. The silica glass rod is inserted through a die 174, and fed to the left in FIG. 17 by movable means, not shown. Then, a head portion 173 of a piercing jig 172 is contacted against the center of an axial end face of the silica glass rod 170 at the end portion heated and fused. Then, the silica glass rod 170 is fed, and the head portion 173 is slid into the inside of the silica glass rod 170 to allow the head portion 173 of the piercing jig 172 to pass in the axial direction of the silica glass rod 170, thereby producing the hollow and cylindrical silica glass rod.

The piercing jig 172 is desirably a carbon rod having a purity of 99 wt % or more. In this way, metal impurities such as Fe, Cr and Ni are prevented from being mixed when producing the silica glass pipe, and the loss in transmission band is prevented from increasing.

In fabricating the pipe, the concentration of impurities other than glass dopants contained in the inner wall of the pipe is preferably 1 wtppm or less. Herein, the inner wall of the pipe means a region having a wall thickness of 1 mm from the inner circumferential surface of the pipe. In addition, the concentration of impurities is more preferably 10 wtppb or less.

In addition, instead of the piercing jig 172 by piercing and the heating means 171, the silica glass rod may be bored by a grinding method using a drill, not shown.

Next, a manufacturing method for the optical fiber preform according to a third embodiment of the invention will be described below. In the following embodiment, the same or like parts in the constitution and action as already described are designated by the same or equivalent numerals, and the description of those parts is simplified or omitted.

In the optical fiber preform manufacturing method of the first and second embodiments as already described, the glass rod is fabricated by integrating the core rod including at least the central core portion and the depressed pipe including at least the depressed portion so that it includes both of the central core portion and the depressed portion. In this optical fiber preform manufacturing method of the third embodiment, the glass rod is fabricated from a core rod becoming the central core portion.

Figure 18:
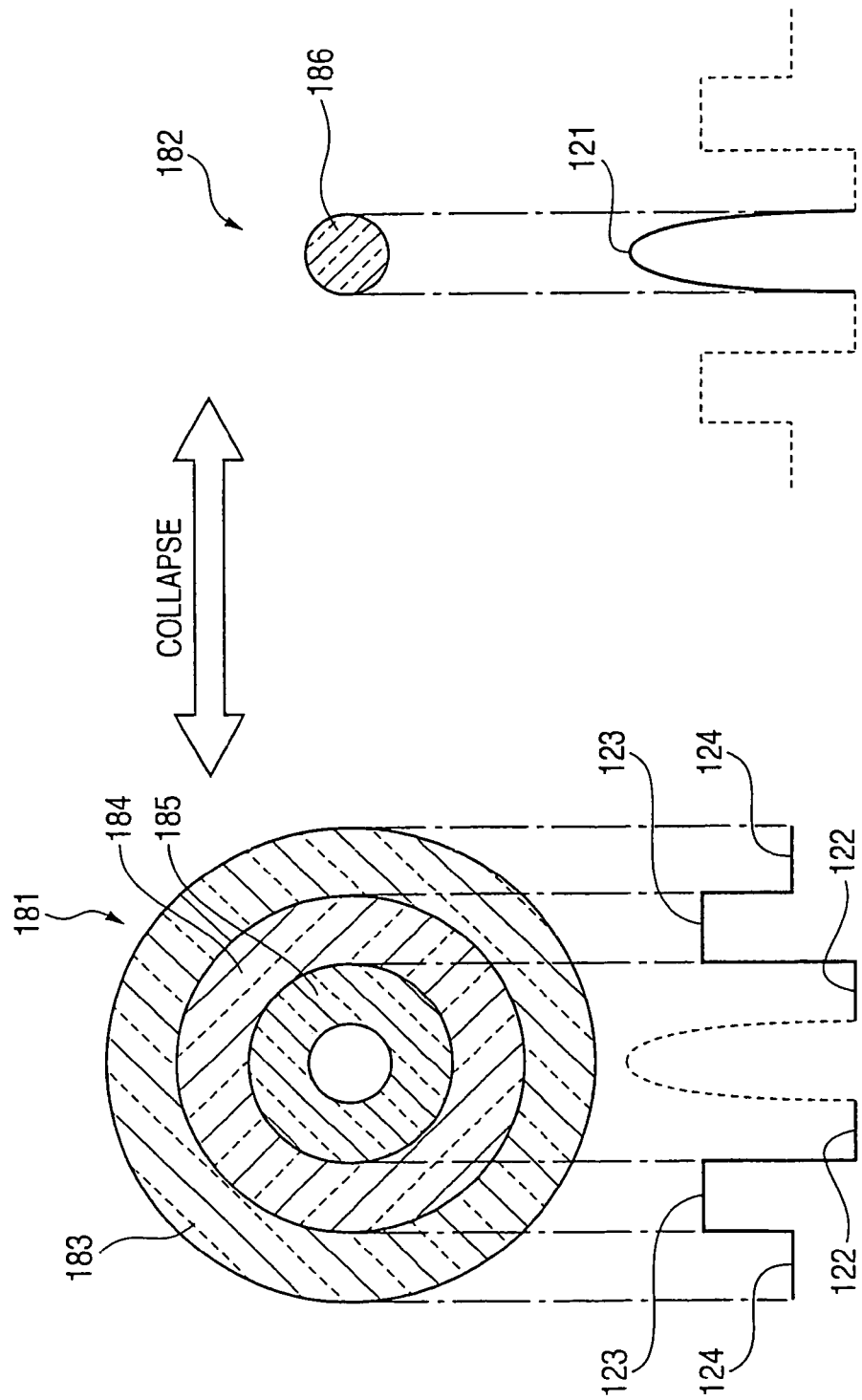
FIG. 18(a) is a view for explaining a process for manufacturing a glass pipe according to a third embodiment.
FIG. 18(b) is a view for explaining a process for manufacturing a glass rod according to the third embodiment.
Figure 19:
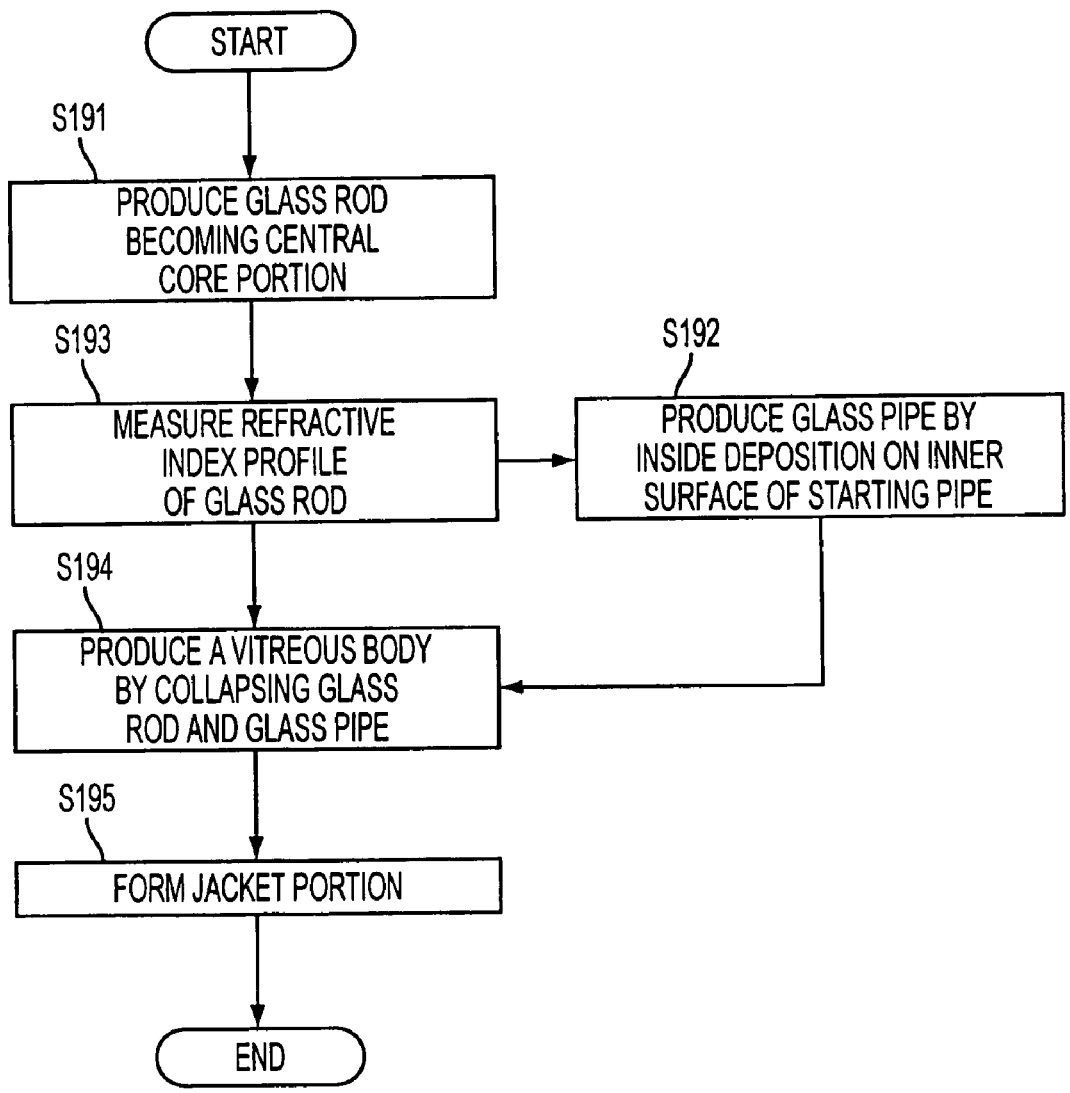
FIG. 19 is a flowchart for explaining a process for manufacturing an optical fiber preform according to the third embodiment.

The refractive index profile of the optical fiber preform according to this embodiment is the same of the second embodiment as shown in FIG. 12. FIG. 18 is a view for explaining a process for manufacturing the optical fiber preform according to this embodiment, in which FIG. 18(a) is a view for explaining a glass pipe fabrication step and FIG. 18(b) is a view for explaining a glass rod fabrication step. FIG. 19 is a flowchart for explaining the process for manufacturing the optical fiber preform according to this embodiment.

The manufacturing method for the optical fiber preform according to this embodiment, manufactures the optical fiber preform having at least a central core portion having a maximal value Nc of refractive index in the center, a depressed portion having a minimal value Nd of refractive index outside the central core portion, a ring portion having a maximal value Nr of refractive index outside the depressed portion, and an outside cladding layer having a maximal value No of refractive index outside the ring portion, the optical fiber preform satisfying a relation Nc≧Nr>No>Nd among the values of refractive index. The optical fiber preform manufacturing method is characterized by comprising a glass rod fabrication step of fabricating a glass rod becoming the central core portion, a glass pipe fabrication step of fabricating a glass pipe by depositing glass layers inside a starting pipe, and an integration step of fabricating the vitreous body by integrating the glass rod and the glass piped by collapse after inserting the glass rod into the glass pipe.

Referring now to FIGS. 18 and 19, the manufacturing method for the optical fiber preform according to this embodiment will be described. As shown in FIGS. 18 and 19, first of all, the glass rod fabrication step of fabricating a glass rod (here, core rod) 186 by a VAD method (step S191). In addition, the glass pipe fabrication step is performed at step S192 as a different step from the glass rod fabrication step. In the glass pipe fabrication step, glass layers are deposited inside a starting pipe 183 corresponding to the second depressed portion 124 to form a glass layer 184 corresponding to the ring portion 123 and a glass layer 185 corresponding to the first depressed portion 122, and thus a glass pipe 181 is fabricated.

Herein, the glass pipe fabrication step may be performed before, during or after the glass rod fabrication step.

The refractive index profile is measured to know the refractive index, and outer diameter of the glass rod 182, employing a preform analyzer (step S193), and the measurement result is fed back to the glass pipe fabrication step at step S192 to design the profile of glass pipe 181.

After the glass rod fabrication step and the glass pipe fabrication step, the glass rod 182 is inserted into the glass pipe 181 and integrated to produce the vitreous body (step S194). Thus, the vitreous body is obtained.

In this embodiment, the glass rod 182 may be designed by measuring the refractive indexes and thicknesses of layers of the glass pipe 181, and feeding back the measurement result to the fabrication step of the glass rod 182 at step S191.

In addition, the jacket portion may be formed by depositing glass particles on the outside of the vitreous body, and heating and consolidating it (step S194). On the other hand, the step of forming the jacket portion may be omitted by performing the process for inserting the vitreous body into the jacket pipe, integrating and drawing it as already described.

EXAMPLES

Figure 20:
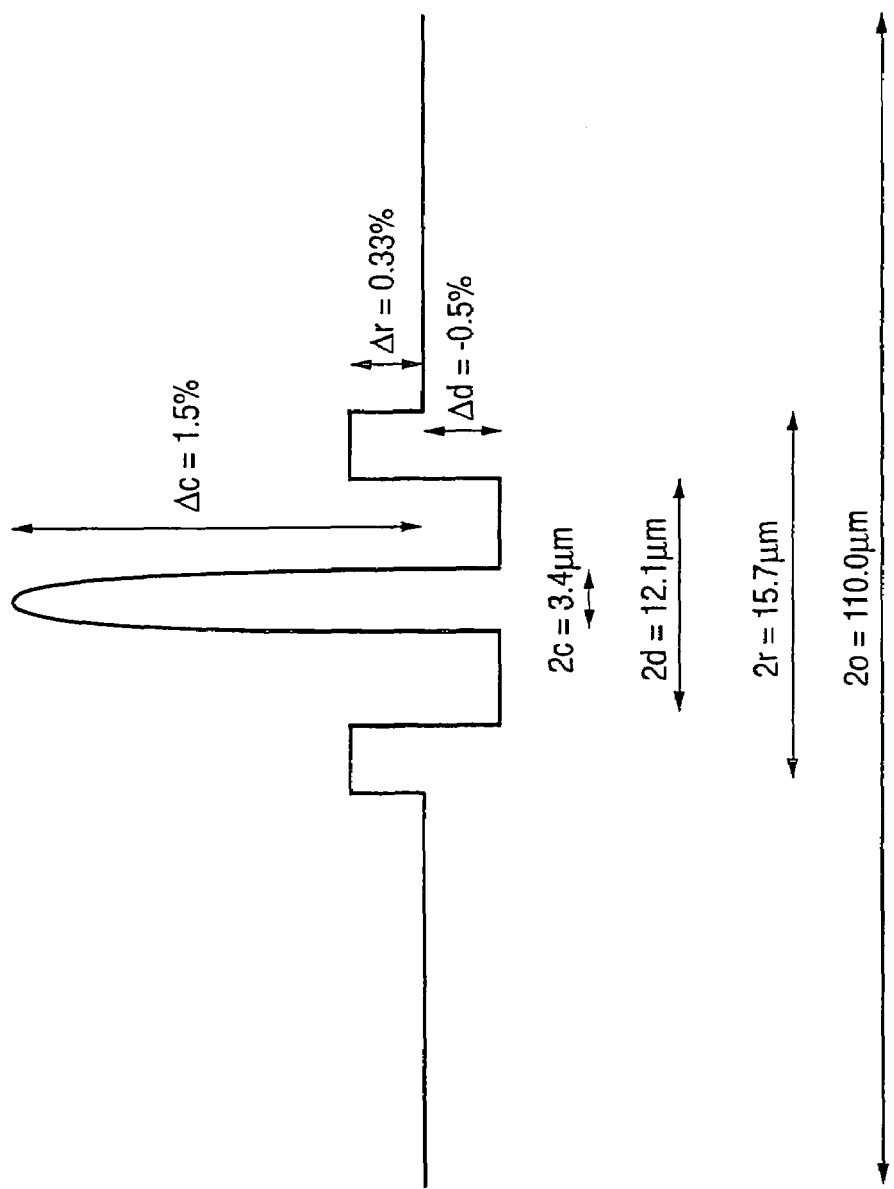
FIG. 20 is a view showing a refractive index profile of an optical fiber produced in a first example.

FIG. 20 shows a refractive index profile of an optical fiber as a first example which is obtained by the optical fiber preform manufacturing method and the optical fiber manufacturing method according to the invention. This example will be described below.

In this example, the obtained optical fiber was designed such that the outer diameter of the central core portion was 3.4 µm, the outer diameter of the depressed portion was 12.1 µm, the outer diameter of the ring portion was 15.7 µm, and the outer diameter of the outside cladding layer was 110.0 µm. In addition, the obtained optical fiber was designed such that the relative refractive index difference Δc of the central core portion to the outside cladding layer was 1.5%, the relative refractive index difference Δd of the depressed portion to the outside cladding layer was −0.5%, and the relative refractive index difference Δr of the ring portion to the outside cladding layer was 0.33%.

A glass rod A becoming the central core portion (that is, core rod), having an outer diameter of φ6.1 mm and containing $GeO_2$ was fabricated by the well-known VAD method. An $SiO_2$ glass pipe B becoming the depressed portion (that is, depressed pipe), having an outer diameter of +35 mm and an inner diameter of φ6 mm and containing fluorine F was fabricated by the well-known VAD method. The concentration of $GeO_2$ for the rod becoming the central core was 16 mol % at the peak, and the shape of the refractive index profile having a graded structure approximated by α=2.0 power. The concentration of F for the glass pipe becoming the depressed portion was 1.4 wt %.

The inner surface of the glass pipe B was etched and smoothed by vapor phase etching to adjust the inner diameter to φ8.5 mm, and smoothed. The vapor phase etching was made by introducing an $SF_6$ gas into the pipe while heating the glass pipe B to about 1500° C. The glass rod A composed of $GeO_2$—$SiO_2$ was inserted into the glass pipe B composed of fluorine F doped silica, and integrated with the glass pipe B by the rod-in collapse method to produce a glass rod C having an outer diameter of φ34.0 mm.

The glass rod C had no occurrence of voids by visual inspection, and the measured ellipticity of the central core portion in the glass rod C was excellent at 0.1% to 0.2%.

The refractive index profile of the glass rod C was measured employing the preform analyzer. Thereafter, desirable Ra, Rb and Δr were designed (hereinafter design I). Consequently, it was revealed that the optical fiber having desired characteristics could be obtained by designing Ra=0.28, Rb=0.77, and Δr=0.3%.

The glass rod C was elongated by oxyhydrogen flame based on the design I, until the outer diameter reaches φ12.20 mm. Then, it was etched in the HF solution, including a dummy rod, until the outer diameter reaches 8.0 mm, and adjusted to have Ra of 0.27 and remove impurities such as OH solved and diffused on the surface layer.

A glass pipe D becoming a part of the outside cladding layer, having an outer diameter of about 34 mm and an inner diameter of 21 mm, and containing chlorine from 10 wtppm to 1000 wtppm was fabricated by the well-known VAD method.

The inner surface of this glass pipe D was etched and smoothed by vapor phase etching to adjust the inner diameter to 22 mm. The vapor phase etching was made by introducing an $SF_6$ gas into the glass pipe while heating the glass pipe D to about 1550° C.

Based on the design I, a glass pipe E was fabricated by depositing an $SiO_2$—$GeO_2$ layer containing 3.0 mol % of $GeO_2$ with 0.5 mm thickness on the inner surface of the glass pipe D by the MCVD method.

This glass pipe E was heated to about 1800° C., and thermally contracted to have an outer diameter of 27 mm and an inner diameter of 10 mm.

The glass rod C was inserted into the glass pipe E, and integrated them by the rod-in collapse method to produce an intermediate product F of optical fiber preform having an outer diameter of 27 mm.

This intermediate product F had no occurrence of voids by visual inspection, and the measured ellipticity of the central core portion in the intermediate product F was excellent at 0.3% to 0.4%.

After the refractive index profile of the intermediate product F of optical fiber preform was measured using the preform analyzer, the desirable core diameter was designed at 3.4 μm.

A jacket portion made of silica containing 0.2 mol % of chlorine was synthesized around the outer circumference of the intermediate product F of optical fiber preform. The refractive index of the jacket portion was almost equivalent to that of the glass pipe D and expanded the diameter of the outside cladding layer. The diameter ratio of the outside cladding layer to the central core portion was adjusted to 32.4.

This optical fiber preform was drawn by the well-known drawing method so that the outer diameter of the outside cladding layer reached 110 μm. The transmission characteristics of the obtained optical fiber were excellent as the dispersion compensating fiber as shown below.

(Transmission characteristics of the optical fiber obtained in the first example)

| | |
|---|---|
| Transmission loss at wavelength of 1550 nm | 0.310 dB/km |
| Chromatic dispersion | −81 ps/km/nm |
| Dispersion slope | −0.82 ps/km/nm² |
| Effect area | 18 μm² |
| Cut-off wavelength | 1350 nm |
| PMD | 0.02 ps/√(km) |

Figure 21:
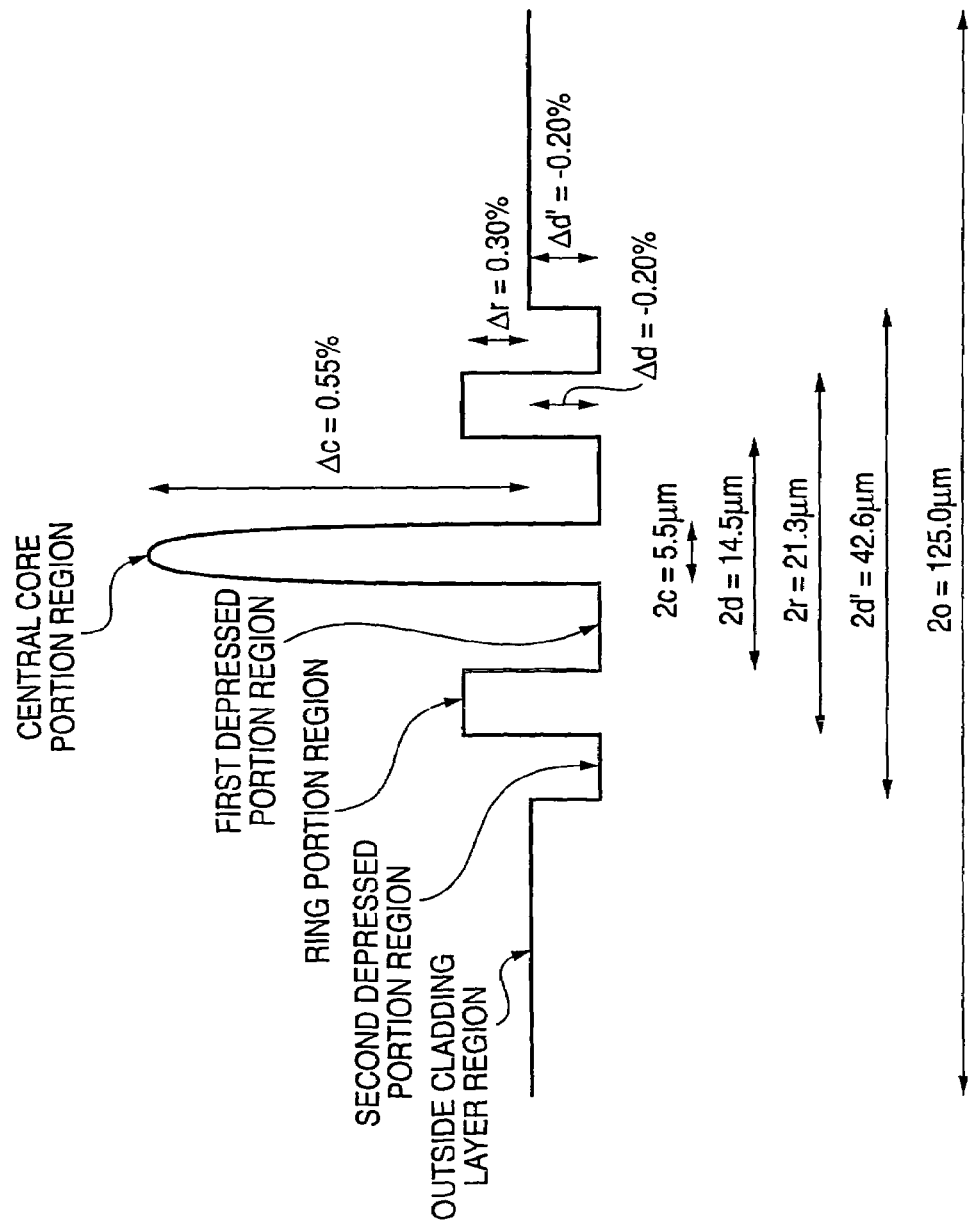
FIG. 21 is a view showing a refractive index profile of an optical fiber produced in a second example.

Referring to FIG. 21, a second example will be described below. FIG. 21 shows a refractive index profile of the optical fiber obtained by the second example method. This example will be described below.

In this example, a second depressed portion was interposed between the outside cladding layer and the ring portion, as shown in FIG. 21.

In this example, to attain the chromatic dispersion of −6.3 ps/nm/km, the obtained optical fiber was designed such that the outer diameter of the central core portion was 5.5 μm, the outer diameter of the first depressed portion was 14.5 μm, the outer diameter of the ring portion was 21.3 μm, the outer diameter of the second depressed portion was 42.6 μm, and the outer diameter of the outside cladding layer was 125.0 μm. In addition, the obtained optical fiber was designed such that the relative refractive index difference Δc of the central core portion to the outside cladding layer was 0.55%, the relative refractive index difference Δd of the first depressed portion to the outside cladding layer was −0.20%, the relative refractive index difference Δr of the ring portion to the outside cladding layer was 0.30%, and the relative refractive index difference Δd' of the second depressed portion to the outside cladding layer was −0.20%.

A glass rod A becoming the central core portion (that is, core rod), having an outer diameter of φ12 mm and containing $GeO_2$ was fabricated by the well-known VAD method. An $SiO_2$ glass pipe B becoming the depressed portion (that is, depressed pipe), having an outer diameter of φ45 mm and an inner diameter of φ12 mm and containing fluorine F was fabricated by the well-known VAD method. The concentration of $GeO_2$ for the rod becoming the central core was 5.5 mol % at the peak, and the shape of the refractive index profile having a graded structure approximated by α=2.0 power. The concentration of F for the glass pipe B becoming the depressed portion was 1.1 wt %.

The inner surface of the glass pipe B was etched and smoothed by vapor phase etching to adjust the inner diameter to φ13.5 mm. The vapor phase etching was made by introducing an $SF_6$ gas into the pipe while heating the glass pipe B to about 1550° C. The glass rod A composed of $GeO_2$—$SiO_2$ was inserted into the glass pipe B composed of fluorine F doped silica, and integrated them by the rod-in collapse method to produce a glass rod C having an outer diameter of φ44.0 mm.

The refractive index profile of this glass rod C was measured, and the outer diameter of the central core portion and the refractive index profiles for the outer portion were designed based on this measurement result.

This glass rod C was visually inspected in accordance with a procedure as already described (see FIG. 6). Consequently, there was a portion having three voids on the integrating interface in a length direction as long as 10 mm of the glass rod. This portion where voids occurred was aborted. In addition, the measured core ellipticity was excellent at 0.1% to 0.2%.

The refractive index profile of the glass rod C was measured employing the preform analyzer. Thereafter, desired Ra, Rb and Δr of were designed (hereinafter design II). Consequently, it was revealed from the design II that the optical fiber having desired characteristics could be obtained by designing Ra=0.38, Rb=0.68, Δr=0.30%, Δd'=−0.2%, and Rc=0.50. Herein, Δd' denotes the relative refractive index difference of the second depressed portion to the outside cladding layer, and Rc denotes the ratio (=$2r/2d'$) of the second depressed portion diameter $2d'$ to the ring diameter $2r$. Based on this design II, the glass rod C was mechanically ground on the outer circumference so that the diameter reaches 34 mm, and was elongated by plasma flame so that the outer diameter reaches 15.1 mm. Then, it was etched in the HF solution, until the outer diameter reaches 14.0 mm, and adjusted to have Ra of 0.38 and remove impurities such as OH solved and diffused on the surface layer.

A glass pipe D becoming a part of the outside cladding layer, having an outer diameter of 40 mm and an inner diameter of 26 mm, and containing 0.6 wt % of fluorine was fabricated by the well-known VAD method.

The inner surface of this glass pipe D was etched and smoothed by vapor phase etching to adjust the inner diameter to 28 mm. The vapor phase etching was made by introducing an $SF_6$ gas into the glass pipe while heating the glass pipe D to about 1550° C. Based on the design II, a glass pipe E with the ring portion and the second depressed portion was fabricated by depositing an $SiO_2$—$GeO_2$ layer containing 3.0 mol % of $GeO_2$ with 2.2 mm thickness on the inner surface of the glass pipe D by the MCVD method. This glass pipe E was heated to about 1800° C., and thermally contracted to have an outer diameter of 35 mm and an inner diameter of 16 mm.

The glass rod C was inserted into the glass pipe E, and integrated with the glass pipe E by the rod-in collapse method to produce a glass rod F having an outer diameter of 34 mm.

This intermediate product F of optical fiber preform had no occurrence of voids by visual inspection, and the measured ellipticity of the central core portion in the intermediate product F was excellent at 0.3% to 0.4%.

After the refractive index profile of the intermediate product F of optical fiber preform was measured using the preform analyzer, the optical fiber was designed to have the desired transmission characteristics if the desirable core diameter was 5.5 μm and Rc=0.50 (hereinafter design III).

Based on this design III, the glass rod F was mechanically ground on the outer circumference so that the outer diameter reaches 28 mm, and Rc was adjusted to 0.50. The outside cladding layer made of silica containing 200 wtppm of chlorine was synthesized on this outer circumference. The diameter ratio of the outside cladding layer to the central core portion was adjusted to 22.7.

This optical fiber preform was drawn by the well-known drawing method so that the outer diameter of the outside cladding layer reached 125 μm. The transmission characteristics of the obtained optical fiber designed as the dispersion shifted fiber were obtained as shown below.

(Transmission characteristics of the optical fiber obtained in the second example)

| | |
|---|---|
| Transmission loss at wavelength of 1550 nm | 0.205 dB/km |
| Chromatic dispersion | −6.3 ps/km/nm |
| Dispersion slope | +0.011 ps/km/nm$^2$ |
| Effect area | 47 μm$^2$ |
| Cut-off wavelength | 1420 nm |
| PMD | 0.02 ps/$\sqrt{(km)}$ |

In the case where the fiber was manufactured without the design II, the dispersion value was deviated from the design value, and showed −9.45 ps/nm/km.

The optical fiber preform manufacturing method, the optical fiber manufacturing method, and the optical fiber are not limited to those as described in the previously described embodiments, but various variations or improvements may be appropriately made.

Figure 22:
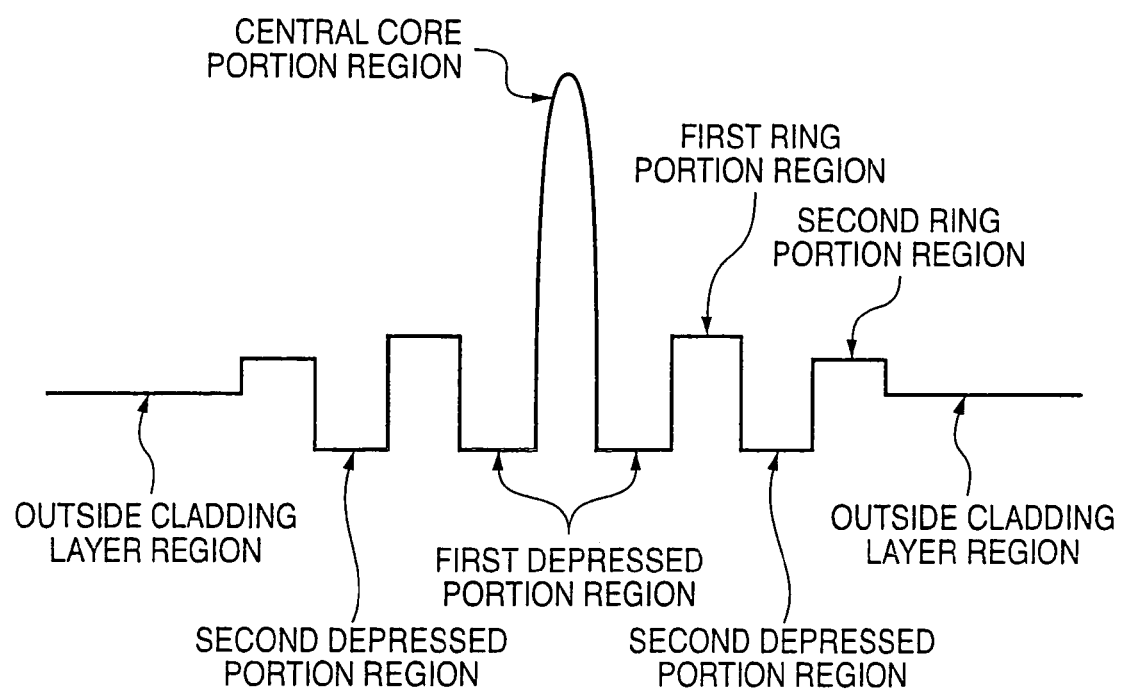
FIG. 22 is a view showing a refractive index profile of an optical fiber produced in a modified example of the second example.

FIG. 22 shows a modified example of the second example. As shown in FIG. 22, the optical fiber preform or the optical fiber may have the refractive index profile in which a second ring portion is provided between the second depressed portion and the outside cladding layer.

The optical fiber is not limited to the structure as shown by the above refractive index profile. The optical fiber may have at least the central core portion, the depressed portion and the ring portion.

Third Example

Next, a third example will be described below.

In this example, the manufacturing method for the optical fiber preform according to the first embodiment was employed.

First of all, the silica glass soot deposited by the OVD method was consolidated and elongated to fabricate a core rod. This core rod had an outer diameter of 4 mm or more, and the average value of outer diameter ellipticity in the whole length was 1% or less. A difference in deviation (eccentricity) between the center of refractive index profile and the center of outer diameter was made 1% or less.

Then, a silica glass pipe was prepared. This silica glass pipe had an outer diameter from 10 mm to 200 mm, and an inner diameter from 4 mm to 100 mm. In addition, the average value of eccentricity ratio of the pipe for the silica glass pipe in the whole length was made 1% or less, and the average value of the eccentricity was 1% or less. Moreover, the ellipticity of outer and inner diameter for the silica glass pipe, and the average value of ellipticity for the silica glass pipe in the whole length were 1% or less respectively.

The silica glass pipe was the fluorine doped silica glass pipe in which fluorine was doped by at least 0.001 wt % to 10 wt %.

The core rod and the silica glass pipe were integrated to fabricate a glass rod by collapse, and then the refractive index profile was evaluated using the preform analyzer (first step).

Then, a pipe made of silica was prepared as a starting rod for glass pipe. This pipe was characterized in that it was produced by depositing glass particles at a deposition rate of 50 g/min or more by the OVD method, and dehydrating and consolidating. This pipe contained from at least 0.001 wt % to 10 wt % of chlorine or fluorine as the dopant, and had an outer diameter from 20 mm to 150 mm and a thickness from 1 mm to 8 mm. In addition, this pipe had an average value of uneven thickness ratio of 0.3% or less in the whole length, and the eccentricity ratio of the pipe, ellipticity of outer and inner diameter were 1% or less on average in the whole length, respectively. Then, a glass layer containing at least one of fluorine, germanium and phosphorus was deposited inside this pipe so as to attain the refractive index and thickness of layer calculated employing the result of evaluating the refractive index profile of the glass rod to have the desirable profile (second step).

The glass rod fabricated at the first step and the glass pipe fabricated at the second step were integrated by collapse to produce the vitreous body (third step).

Then, glass particles were deposited on the outer circumference of the vitreous body produced at the third step at a deposition rate of 50 g/min or more by the OVD method to form a jacket portion. This jacket portion was dehydrated and consolidated to fabricate the optical fiber preform (preform) in which the variation of ratio of the diameter of the vitreous body portion to the diameter of the jacket portion in the longitudinal direction of this consolidated body was 1% or less, the converted length was 400 km or more, and the ellipticity of central core portion in the whole length was 1.5% or less (fourth step).

The optical fiber preform fabricated at the fourth step was drawn at a drawing speed of 1000 m/min or more (fifth step).

Figures 23, 24:
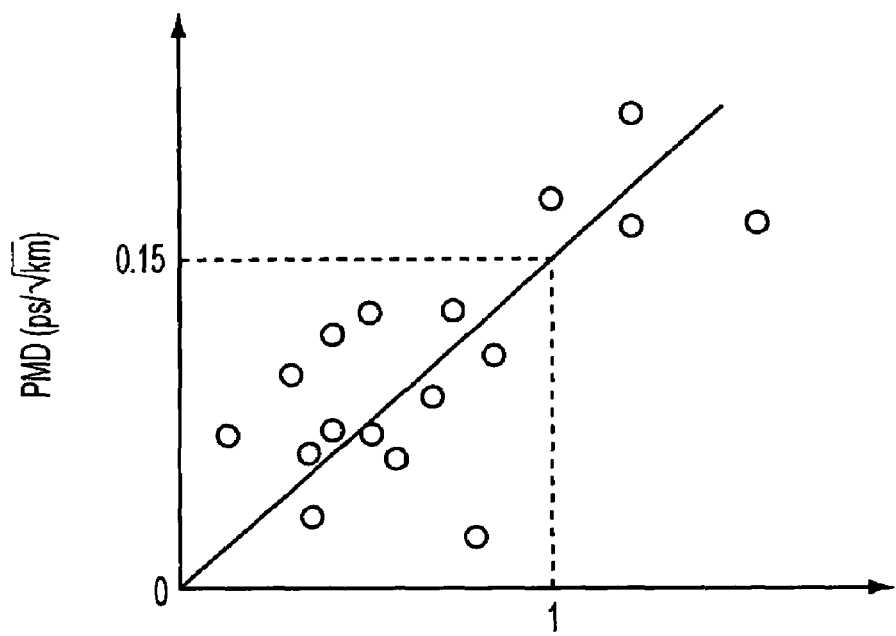
FIG. 23 is a graph showing the relationship between the PMD and the uneven thickness ratio of a pipe, eccentricity ratio of central core portion in a glass rod and ellipticity of central core portion in a glass rod.
FIG. 24 is a graph showing the relationship between the wall thickness of the starting pipes used in MCVD method and the wavelength non-dependent loss component.

FIG. 23 is a graph showing the relationship between the PMD (ps/$\sqrt{(km)}$) and the uneven thickness ratio of pipe and the eccentricity of the central core portion (%). As shown in FIG. 23, when the uneven thickness ratio of the pipe, the eccentricity ratio of central core portion and the ellipticity of the central core portion (%) were 1% or less as in this example, the PMD was 0.15(ps/$\sqrt{(km)}$) or less.

Herein, the uneven thickness ratio of pipe means a percentage of a difference between the maximum and minimum values to the maximum value of wall thickness of pipe. The eccentricity ratio of central core portion means a percentage of a deviated amount between the central point of central core portion and the central position of the rod. The ellipticity of central core portion means a percentage of a difference between the maximum and minimum values to the maximum value of outer diameter of the central core portion.

FIG. 24 is a graph showing the relationship between the wall thickness of the pipe used in the MCVD method (mm) and the wavelength independent loss component (also called the B value, unit of dB/km) at a communication wavelength of 1.55 μm. As shown in FIG. 24, if the wall thickness of pipe is smaller, the roughness of the boundary surface of the glass layer formed inside the pipe is reduced, and the loss caused by incompleteness of layer structure is decreased. When the wall thickness was 8 mm or less as in this example, the wavelength independent loss component was 0.01 dB/km or less.

In this example, the optical fiber with low PMD was obtained. In addition, the large optical fiber preform was synthesized at high rate, whereby the optical fiber preform with low cost was manufactured.

Fourth Example

Next, a fourth example will be described below.

In this example, the manufacturing method for the optical fiber preform according to the first embodiment was employed.

First of all, the silica glass soot deposited by the OVD method was consolidated and elongated to fabricate a core rod. This core rod had an outer diameter of 4 mm or more, and the average value of the whole length of outer diameter ellipticity was 1% or less. A difference in deviation (eccentricity) between the center of refractive index profile and the center of outer diameter was made 1% or less.

Then, a silica glass pipe was prepared. This silica glass pipe had an outer diameter from 10 mm to 200 mm, and an inner diameter from 4 mm to 100 mm. In addition, the average value of uneven thickness for the silica glass pipe was 1% or less, and the average value of eccentricity ratio of the pipe was 1% or less. Moreover, the ellipticity of outer and inner diameter for the silica glass pipe, and the average value of ellipticity for the silica glass pipe in the whole length were 1% or less.

The silica glass pipe was the fluorine doped silica glass pipe in which fluorine was doped by at least 0.001 wt % to 10 wt %.

The core rod and the silica glass pipe were integrated to fabricate a glass rod by rod-in collapse, and then the refractive index profile was evaluated using the preform analyzer (first step).

Then, a pipe made of silica was prepared as a starting rod for glass pipe. This pipe was characterized in that it was produced by depositing glass particles at a deposition rate of 50 g/min or more by the OVD method, and dehydrating and consolidating. This pipe contained from at least 0.001 wt % to 10 wt % of chlorine atoms or fluorine atoms as the dopant, and had an outer diameter from 20 mm to 150 mm and a wall thickness from 1 mm to 8 mm. In addition, this pipe had an average value of eccentricity ratio of 1% or less in the whole length and an average value of uneven thickness ratio of 0.3% or less, and the ellipticity of outer and inner diameter in the whole length of the pipe were 1% or less on average respectively. And a glass layer containing at least one of fluorine, germanium and phosphorus was deposited inside this pipe so as to attain the refractive index and thickness of layer calculated employing the result of evaluating the refractive index of the glass rod to have the desirable profile. Then, the glass rod fabricated at the first step and the glass pipe were integrated by collapse to produce the vitreous body (second step).

Then, a silica glass pipe serving as the jacket pipe was prepared. This silica glass pipe has an outer diameter from 10 mm to 200 mm. In addition, the average value of uneven thickness ratio of the pipe was 1% or less, the average value of eccentricity ratio was 1% or less, and the ellipticity of outer and inner diameter were 1% or less on the average. This silica glass pipe contained chlorine atoms of at least 0.001 wt % to 10 wt %. The vitreous body produced at the second step of this example was inserted into this silica glass pipe. Then, the vitreous body and the silica glass pipe were integrated to have a preform size of 400 km converted to length of optical fiber, and drawn (rod-in drawn) at a drawing speed of 1000 m/min (third step).

In this example, the optical fiber with low PMD was obtained. In addition, if a jacket pipe with large outer diameter is prepared, and the vitreous body is inserted into the jacket pipe and rod-in drawn, a process for depositing glass particles on the outer circumference of the vitreous body and dehydrating and consolidating can be eliminated, therefore the fiber manufacturing process with low cost was implemented.

Moreover, the large optical fiber preform was synthesized at high rate, whereby the optical fiber preform with low cost was manufactured.

Fifth Example

Next, a fifth example will be described below.

In this example, the manufacturing method for the optical fiber preform according to the third embodiment was employed.

First of all, a silica glass pipe was prepared as a starting rod for glass pipe. This silica glass pipe contained fluorine of at least 0.01 wt % to 10 wt %, had an outer diameter from 10 mm to 200 mm, and an inner diameter from 4 mm to 100 mm. In addition, this pipe was the fluorine doped silica glass pipe in which the average value of uneven thickness ratio in the whole length of the silica glass pipe was 1% or less, the average value of eccentricity ratio of pipe was 1% or less, and the ellipticity of outer diameter was 1% or less on average. And a silica glass layer containing at least one of fluorine, germanium and phosphorus as the dopant was deposited on the inner circumferential surface of this silica glass pipe to fabricate a glass pipe. Thus, the refractive index profile was evaluated employing the preform analyzer (first step).

Then, a deposited body of silica glass particles deposited by the OVD method was consolidated, and elongated to fabricate a glass rod. This glass rod had an outer diameter of 4 mm or more, such that the average value of ellipticity of outer diameter in the whole length was 1% or less respectively. A difference in deviation (eccentricity) between the center of refractive index profile and the center of outer diameter was 1% or less. This glass rod and the glass pipe fabricated at the first step were integrated by collapse to produce the vitreous body (second step).

A jacket portion was formed around the outer circumference of the vitreous body obtained at the second step to fabricate the optical fiber preform. The deposition rate of glass particles composing the jacket portion was 50 g/min or more. Then, deposited glass particles were consolidated so that the variation of ratio of the diameter of the vitreous body portion to the diameter of the jacket portion in the axial direction was 1% or less. In addition, the preform size was a 400 km length converted into length of an optical fiber, and the ellipticity of the central core portion in the produced optical fiber preform was 1.5% or less in the whole length (third step).

The optical fiber preform produced at the third step was drawn at a drawing speed of 1000 m/min or more to manufacture the optical fiber (fourth step).

In this example, it is possible to shorten the glass synthesis time by the MCVD process in which the deposition rate is relatively low, and increase an area produced through the fast synthesis process (OVD method), whereby the optical fiber was manufactured at low cost.

Sixth Example

Next, a sixth example will be described below.

In this example, the manufacturing method for the optical fiber preform according to the third embodiment was employed.

First of all, a silica glass pipe was prepared as a starting rod for glass pipe. This silica glass pipe contained fluorine of at least 0.01 wt % to 10 wt %, had an outer diameter from 10 mm to 200 mm, and an inner diameter from 4 mm to 100 mm. In addition, this pipe was the fluorine doped silica glass pipe in which the average value of uneven thickness ratio of the pipe in the whole length of the silica glass pipe was 1% or less, the average value of eccentricity ratio of the pipe was 1% or less, and the ellipticity of the outer diameter was 1% or less on average. Then a silica glass layer containing at least one of fluorine, germanium and phosphorus as the dopant was deposited on the inner circumferential surface of this silica glass pipe to fabricate a glass pipe (first step).

Then, a deposited body of silica glass particles deposited by the OVD method was consolidated, and elongated to fabricate a glass rod. This glass rod had an outer diameter of 4 mm or more, such that the average value of ellipticity of outer diameter in the whole length was 1% or less. A difference in deviation (eccentricity) between the center of refractive index profile and the center of outer diameter was 1% or less. This glass rod and the glass pipe fabricated at the first step were integrated by collapse to produce the vitreous body (second step).

A silica glass pipe serving as the jacket pipe was prepared. This silica glass pipe had an outer diameter from 10 mm to 200 mm, and an inner diameter from 4 mm to 100 mm. In addition, the average value of uneven thickness ratio of the silica glass pipe was 1% or less, the average value of eccentricity ratio of pipe was 1% or less, and the ellipticity of outer diameter and inner diameter were 1% or less on average respectively. The silica glass pipe contained chlorine of at least 0.001 wt % to 10 wt %. The vitreous body produced at the second step was inserted into this silica glass pipe. The vitreous body and the silica glass pipe were integrated to have a preform size of 400 km converted to length of optical fiber and drawn at a drawing speed of 1000 m/min or more (third step).

In this example, it is possible to shorten the glass synthesis time by the MCVD process in which the deposition rate is relatively low, and increase an area produced through the fast synthesis process (OVD method), whereby the optical fiber was manufactured at low cost. In addition, the integration and drawing steps for the optical fiber preform were commonly performed to reduce the manufacturing cost.

In the third to sixth examples, in fabricating the glass rod, it is preferable that at least one of the outer circumference of core and the inner circumference of pipe are ground or etched in vapor or liquid phase as a method for adjusting the outer diameter ratio of the cladding to the core. In this way, the optical fiber preform conforming to the desirable characteristics can be obtained by adjusting beforehand the magnification of cladding to core.

In the third to sixth examples, it is preferable to dope at least germanium (Ge) as the dopant to the core portion. In this way, the refractive index of the core portion can be increased over pure silica.

In the third to sixth examples, in fabricating the silica glass pipe, it is preferable to synthesize silica glass particles by the OVD method and then dehydrate and consolidate so that the residual OH group in the pipe may be 0.1 wtppm or less. In this way, it is possible to reduce the absorption loss of OH group of the optical fiber in which the cost is lower through the fast synthesis process.

In the third to sixth examples, it is preferable to employ a gas having the compound containing at least fluorine atoms or fluorine when consolidating the deposited body of glass particles as a method for fabricating the fluorine doped silica glass pipe. Alternatively, it is preferable to employ a gas having the compound containing at least fluorine atoms or fluorine and a helium gas when consolidating the deposited body of glass particles. In this way, the refractive index can be decreased over pure silica and be adjusted to the desired index.

In the third to sixth examples, it is preferable to pierce a through hole in the axial direction of the pipe by piercing or grinding as a method for fabricating the silica glass pipe. The piercing allows the hole to be pierced through the glass pipe at high speed, thereby reducing the manufacturing cost.

In the piercing, it is preferable that the concentration of impurities other than dopants on the inner wall of pipe is 1 wtppm or less. In addition, it is more preferable that the concentration of impurities other than dopants on the inner wall of pipe is 10 wtppm or less. In this way, it is possible to prevent the loss of transmission band from increasing due to impurities such as transition metals mixed into the inner surface of pipe.

In the third to sixth examples, it is preferable that the deposition rate of glass deposited on the glass pipe is 0.4 g/min or more, or more preferable that the deposition rate is 1 g/min or more. In this way, the optical fiber is manufactured at lower cost by performing the MCVD method fast.

In the third to sixth examples, it is preferable to employ an oxyhydrogen burner, an electric resistance furnace, a thermal plasma torch or an induction furnace as heating source in making the MCVD method. More preferably, the electric resistance furnace, a thermal plasma torch or an induction furnace may be employed. Since water contents do not occur in the heating sources, the optical fiber with low absorption loss of OH group at a wavelength of 1.38 µm can be fabricated. Moreover, to increase the deposition rate by the MCVD method, it is preferable to heat the inside of pipe sufficiently, for which the thickness of pipe may be reduced. When the oxyhydrogen burner is used as the heating source, the heating source heats the outer circumference of pipe while producing water contents by itself, whereby the OH group absorption is increased as the thickness of pipe is smaller.

In particular, the fluorine doped pipe is more likely to diffuse the OH group than the chlorine doped pipe. Therefore, it has been found that when the pipe doped fluorine is used as the starting pipe, it is important that the heating source is waterless. For example, in a sample in which glass layers deposited inside a pipe (25 mm in outer diameter 17 mm in inner diameter) having a concentration of doped fluorine of 0.2 wtppm and the oxyhydrogen burner was employed as a heat source, the excess loss at a wavelength of 1.38 µm was 0.8 dB/km, as a result of the OH group having diffused inside through the pipe outer surface. On the contrary, in the optical fiber in which the starting pipe is the silica pipe (with chlorine doped concentration of 200 wtppm) not containing fluorine, and the outer diameter and refractive index of core is adjusted to have the same light intensity distribution as the fluorine doped pipe, the excess loss caused by the OH group was 0.5 dB/km.

On the contrary, when the plasma or induction furnace source is employed, the excess loss was 0.11 dB/km in any case. Thereby, it was confirmed that the diffusion of OH group specific to the oxyhydrogen burner was reduced so that the optical fiber had less diffusion of OH group.

In the third to sixth examples, it is preferable to elongate the vitreous body in the axial direction before forming the jacket portion around the vitreous body. In this way, the outer diameter of the vitreous body can be adjusted beforehand by elongating.

In the third to sixth examples, it is preferable to elongate the vitreous body in the axial direction before forming the jacket portion around the vitreous body, and then etch the outer circumference of the vitreous body. In this way, the absorption loss at wavelength of 1.38 µm due to the OH group is reduced.

In the third to sixth examples, an induction furnace, an electric resistance furnace, an oxyhydrogen flame or a thermal plasma torch is preferably employed as the heating source in collapse. In addition, more preferably, the induction furnace is employed. By employing the induction furnace, the length of heating zone is shortened. In addition, owing to uniform heating around the entire circumference, the deformation of the core in collapse is reduced.

In the third to sixth examples, preferably, the absolute pressure within the pipe during integration is 10 kPa or less and the temperature of pipe outer surface during collapse is from 1000° C. to 1600° C. in integration. In addition, more preferably, the absolute pressure within the pipe during collapse is 10 kPa or less and the temperature of pipe outer surface during collapse is from 1000° C. to 1600° C. in integration. In this way, the absorption loss at wavelength of 1.38 µm due to the OH group is reduced.

In the third to sixth examples, when the starting pipe is the fluorine doped silica glass pipe or pure silica glass pipe, a thermal plasma torch, an induction furnace or an electric resistance furnace is preferably employed as the heating source in integration. Since the fluorine doped silica glass pipe or pure silica glass pipe suppresses the OH group from diffusing, the heating source has less water content. When the waterless heating source is used, the removal amount of the glass layer having absorptive water content is decreased, whereby the optical fiber preform is manufactured at low cost.

In the third to sixth examples, it is preferable to draw the optical fiber while twisting the optical fiber. In this way, the PMD is reduced. In addition, in drawing, the tension of the optical fiber with coating is preferably from 30 g to 300 g. In this way, since a change in the residual stress within the optical fiber according to the composition of the optical fiber preform manufactured is reduced by regulating the tension of the optical fiber with coating, a variation in the characteristics of the optical fiber after drawing is reduced by adjusting the tension.

In the third to sixth examples, the glass diameter after drawing is preferably from 90 µm to 250 µm.

In the third to sixth examples, the optical fiber has the absorption loss at a wavelength of 1.38 µm due to the OH group that is preferably 0.2 dB/km or less, and more preferably 0.1 dB/km or less. In this way, the optical fiber having small OH absorption loss is manufactured by introducing the waterless process in collapse.

FIG. 23 is a graph showing the relationship between the PMD (ps/$\sqrt{(km)}$) and the uneven thickness ratio of the pipe and the eccentricity ratio of the central core portion (%). As shown in FIG. 23, when the average value of uneven thickness ratio of the pipe and eccentricity ratio of the central core portion (%) in the axial direction was 1% or less as in the third to sixth examples, the PMD was 0.15(ps/$\sqrt{(km)}$) or less.

FIG. 24 is a graph showing the relationship between the wall thickness of a starting pipe for an MCVD method (mm) and the wavelength independent loss component (In addition called the B value, unit of dB/km) at a wavelength of 1.55 µm. As shown in FIG. 24, if the wall thickness is smaller, the roughness of the boundary surface of the glass layer formed inside the pipe is reduced. When the wall thickness of a starting pipe was 8 mm or less as in the third to sixth examples, the wavelength independent loss component was 0.01 dB/km or less.

In this example, the optical fiber with low PMD was obtained. In addition, the large optical fiber preform was synthesized at high rate, whereby the optical fiber preform with low cost was manufactured.

Figure 25:
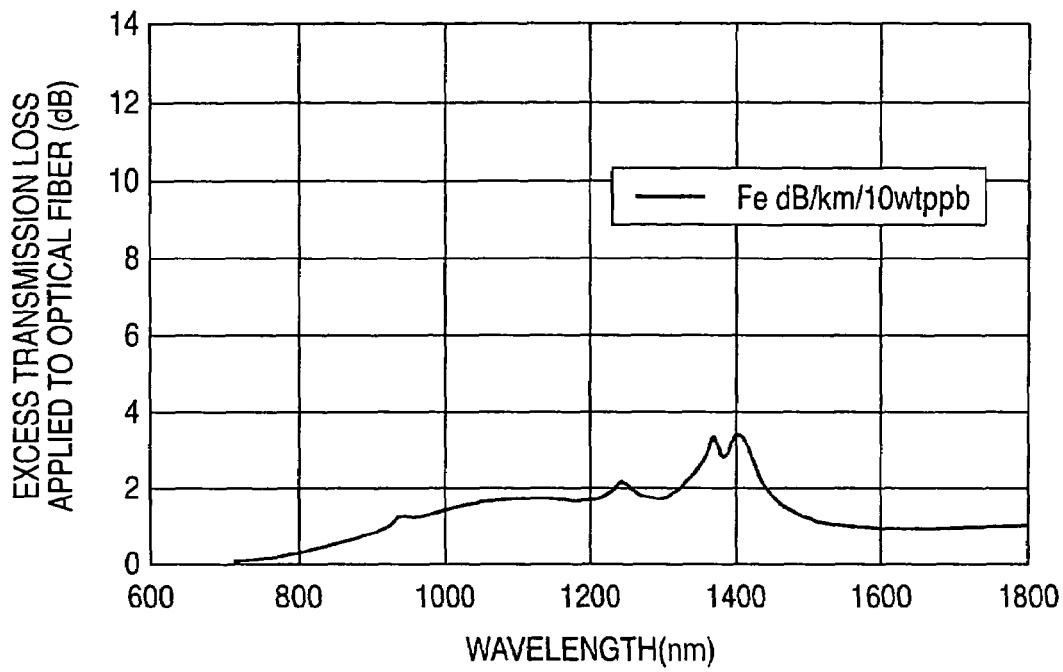
FIG. 25 is a graph showing one example of the relationship between the transmission loss and the wavelength of absorption spectrum for transition metal Fe.

FIG. 25 is a graph showing the relationship between the transmission loss (dB/km) and the wavelength (nm) of absorption spectrum for transition metal. In FIG. 25, the transition metal was iron (Fe) as a component of the stainless pipe generally employed for the source gas supply line. Herein, the transmission loss (dB/km) to signal wavelength in a transmission band was measured by adding iron of 10 wtppm in a signal transmission area for the optical fiber. As shown in FIG. 25, when transition metals such as Fe are mixed as impurities into the inner wall of pipe, the transmission loss is increased. Therefore, when the pipe is produced by piercing as described above, a piercing jig with high purity is preferably employed to lower the concentration of impurities other than dopants on the inner wall of pipe.

In this invention, the induction furnace is preferably employed as the heating source in integration by collapse.

Figure 26:
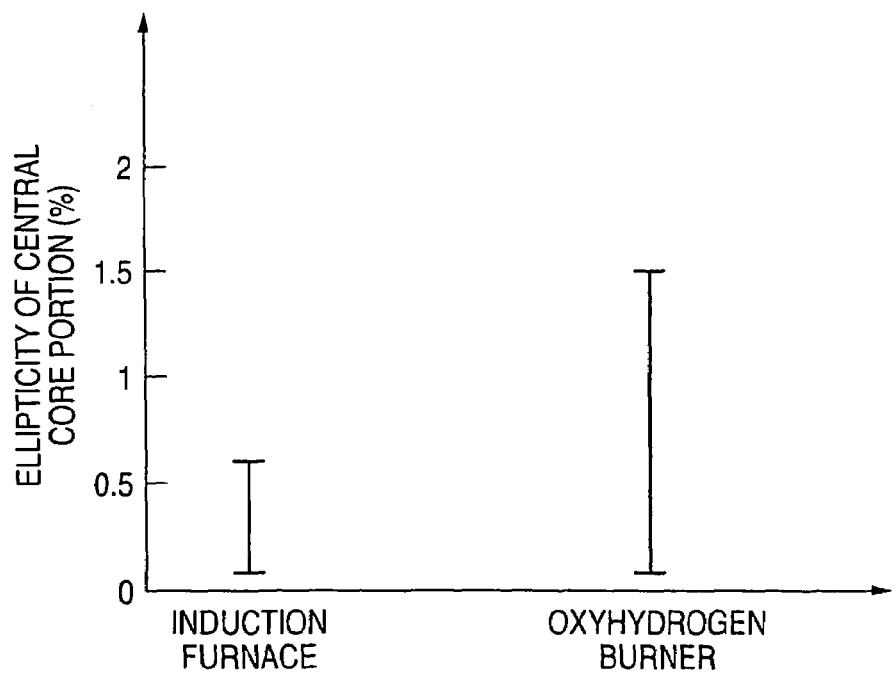
FIG. 26 is a graph showing the relationship between the ellipticity of central core portion in glass rod and the heating source used in integration.

FIG. 26 is a graph showing the relationship (characteristic distribution) between the ellipticity of central core portion (%) and the heating method. As shown in FIG. 26, the induction furnace heats the pipe uniformly around the entire circumference, the ellipticity of the central core portion after integration is reduced as compared with the oxyhydrogen burner.

In this invention, it is preferable that the glass pipe and the glass rod to be integrated are dehydrated and baked in a chlorine atmosphere where the flow rate is 0.1 slm (standard liter/min) or more and the pipe surface temperature is 800° C. or higher. In this way, the water content adsorbed onto the glass rod and the inner wall of glass pipe is removed.

In addition, the inner surface of pipe is preferably etched in vapor phase before collapse. In this way, the foreign particle or OH contained layer adherent on the inner surface of the pipe is removed.

Figure 27:
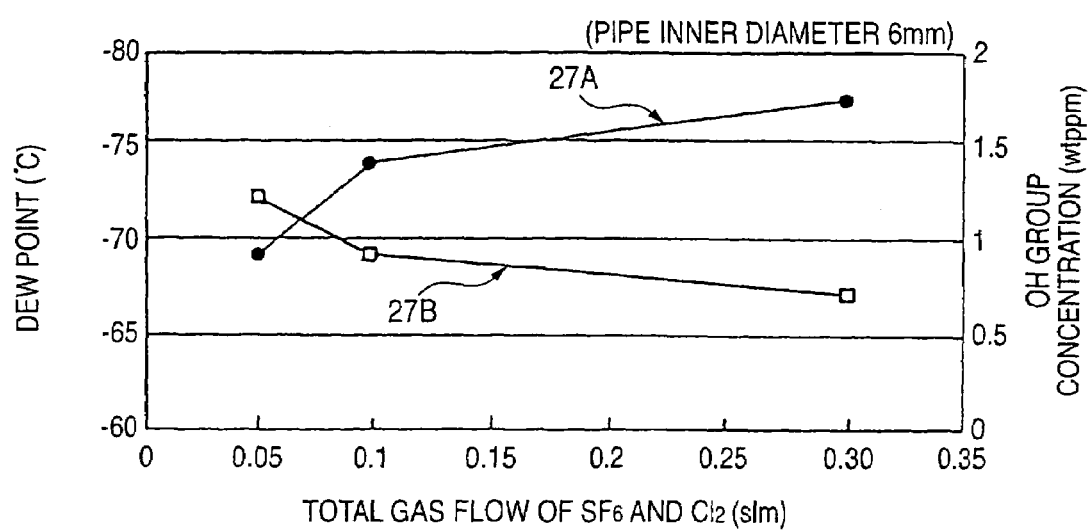
FIG. 27 is a graph showing the relationship between the dew point and OH group concentration and the total flow amounts of gases $SF_6$ and $Cl_2$.

FIG. 27 is a graph showing the relationship between the dew point (° C.) of gases and OH group concentration (wtppm) in a pipe and the total flow amounts (slm) of gases $SF_6$ and $Cl_2$. In FIG. 27, reference numeral 27A denotes the relationship between the dew point (° C.) and the total flow amounts (slm) of gases $SF_6$ and $Cl_2$, and reference numeral 27B shows the relationship between the OH group concentration (wtppm) and the total flow amounts (slm) of gases $SF_6$ and $Cl_2$. As shown in FIG. 27, the dew point (° C.) and the OH group concentration (wtppm) are decreased when the total flow amounts (slm) of gases $SF_6$ and $Cl_2$ are increased.

In this invention, in etching, it is preferable that the flow rate of $Cl_2$, is 0.1 slm or more, the flow rate of $SF_6$ is 50 sccm (standard cc/min) or more, and the pipe surface temperature is 1500° C. or higher. In this way, the foreign matter or OH contained layer adherent on the pipe surface is removed.

Seventh Example

In a seventh example, an optical fiber was manufactured, employing the manufacturing method for the optical fiber preform according to the second embodiment. In this example, the relative refractive index difference $\Delta c$ of the central core portion 121 was 0.5%, the relative refractive index difference $\Delta r$ of the ring portion 123 was 0.27%, the relative refractive index difference $\Delta d1$ of the first depressed portion was −0.3%, the relative refractive index difference $\Delta d2$ of the second depressed portion was −0.15%.

Referring to FIG. 12, the ratio Ra of the outer diameter $2c$ of the central core portion 121 to the outer diameter $2d$ of the first depressed portion 122 was 0.66, the ratio Rb of the outer diameter $2d$ of the first depressed portion 122 to the outer diameter $2r$ of the ring portion 123 was 0.57, and the ratio Rc of the outer diameter $2r$ of the ring portion 123 to the outer diameter $2d'$ of the second depressed portion 124 was 0.5.

The starting pipe for the glass rod had an outer diameter of 30 mm, an inner diameter of 17 mm, and a length of 1900 mm. The inner diameter face of the starting pipe was etched before integration.

Then, a core rod having an outer diameter of 17 mm, the average value of ellipticity in the whole length being 0.2%, and a length of 1750 mm was prepared. The rod was inserted into the starting pipe, and integrated by collaps. In this way, a glass rod with core and depressed portions was produced.

Then, glass layers were deposited on the starting pipe for an MCVD method. At this time, the fluorine doped silica pipe corresponding to the second depressed portion 124 was used, and an additional layer containing germanium and additional layers containing fluorine were deposited inside the starting pipe for the glass pipe. At this time, the deposition rate of the glass layer was 1.1 g/min. Herein, the starting pipe for MCVD method had an outer diameter of 32 mm and an inner diameter of 11 mm, with a length shorter by 9 mm than the glass rod. In this way, the glass pipe was fabricated. The glass rod and the glass pipe were integrated by collapse to produce the vitreous body.

Then, a jacket portion was formed around the vitreous body to fabricate the optical fiber preform in the following way. The deposition rate of glass particles was 100 g/min, the outer diameter of the jacket portion after consolidating was 91.5 mm, the axial length was 1280 mm, the ellipticity of the central core portion was 0.1%, and the average value of outer diameter ellipticity for the vitreous body in the whole length was 0.22%.

The optical fiber preform was drawn in the following way. The optical fiber preform was drawn under the conditions where the drawing speed was 1200 m/min, the tension was 50 g, and the twisting speed of the fiber was 50 rpm, so that the drawing length was 685 km. The PMD of the drawn optical fiber was 0.12 ps/$\sqrt{(km)}$.

As described above, the optical fiber having excellent characteristics was obtained in this example.

On the other hand, instead of forming the jacket portion, the vitreous body was inserted into the jacket pipe (outer diameter of 80 mm, inner diameter of 31 mm) and rod-in drawn, whereby the optical fiber having excellent characteristics was obtained in this example.

Eight Example

In an eighth example, an optical fiber was manufactured, employing the manufacturing method for the optical fiber preform according to the third embodiment. In this example, the relative refractive index difference $\Delta c$ was 0.5%, the relative refractive index difference $\Delta r$ was 0.27%, the relative refractive index difference $\Delta d1$ was −0.3%, the relative refractive index difference $\Delta d2$ was −0.15%, and the relative refractive index difference $\Delta o$ was 0%.

Referring to FIG. 12, the ratio Ra of the outer diameter $2c$ of the central core portion 121 to the outer diameter $2d$ of the first depressed portion 122 was 0.66, the ratio Rb of the outer diameter $2d$ of the first depressed portion 122 to the outer diameter $2r$ of the first ring portion 123 was 0.57, and the ratio Rc of the outer diameter $2r$ of the first ring portion 123 to the outer diameter $2d'$ of the second depressed portion 124 was 0.5.

A starting pipe for a glass pipe with ring and depressed portion corresponding to the second depressed portion 124 was prepared. This starting pipe had an outer diameter of 32 mm, an inner diameter of 8 mm, and a length of 1900 mm. The inner surface of the starting pipe was etched before glass layers were deposited. Thereafter, a glass layer corresponding to the first ring portion 123 and a glass layer corresponding to the first depressed portion 122 were produced by depositing silica glass layers doped with germanium and silica glass layers doped with fluorine inside the starting pipe by the MCVD method to fabricate the glass pipe with ring and depressed portions. Herein, the deposition rate of the glass layer in the MCVD method was 0.5 g/min.

Then, a glass rod having an outer diameter of 6 mm, the average value of ellipticity in the whole length being 0:2%, and a length of 1800 mm was prepared. The glass rod and the glass pipe were integrated by collapse to produce a vitreous body. Thereafter, the outer circumferential body of the vitreous body was smoothed by flame.

Then, a jacket portion was formed around the vitreous body in the following way. The outer diameter of the vitreous body was 31 mm, the deposition rate of glass particles was 100 g/min, the outer diameter of the jacket portion after consolidating was 90 mm, the length was 1280 mm, the average value of ellipticity of the central core portion in the whole length was 0.1%, and the average value of outer diameter ellipticity for the vitreous body in the whole length was 0.2%.

At the drawing step, the optical fiber preform was drawn under the conditions where the drawing speed was 1200 m/min, the tension of the fiber was 50 g, and the twisting speed of the fiber was 50 rpm, so that the drawn length was 685 km. The PMD of the drawn optical fiber was 0.11 ps/$\sqrt{}$(km).

As described above, the optical fiber having excellent characteristics was obtained in this example.

On the other hand, instead of forming the jacket portion, the vitreous body was inserted into the jacket pipe (outer diameter of 80 mm, inner diameter of 31 mm) and rod-in drawn, whereby the optical fiber having excellent characteristics was obtained in this example.

To increase the deposition rate of glass layer formed by the MCVD method, a wall thickness of a starting pipe is desirably reduced (e.g., 2 mm to 8 mm), because the inside of pipe is efficiently heated by the external heating source to increase the soot production rate of source gas. For example, in a case of thickness 4 mm, the deposition rate of silica glass layer can be increased to 2 g/min.

This invention is not limited to the embodiments as described above, but various variations or improvements may be appropriately made thereto.

For example, fibers with multiple layered structure can be manufactured, employing the manufacturing method for the optical fiber preform according to this invention.

FIG. 28 shows a refractive index profile of the optical fiber preform for the multiple layered fiber.

In the optical fiber preform of FIG. 28, the relative refractive index difference $\Delta c$ of a central core portion 281 was 0.5%, the relative refractive index difference $\Delta d1$ of a first depressed portion 282 was −0.3%, the relative refractive index difference $\Delta r1$ of a first ring portion 283 was 0.27%, the relative refractive index difference $\Delta d2$ of a second depressed portion 284 was −0.15%, the relative refractive index difference $\Delta r2$ of a second ring portion 285 was 0.17%, and the relative refractive index difference $\Delta o$ of an outside cladding layer 286 was 0%. That is, there is a relation $\Delta c \geq \Delta r1 > \Delta r2 > \Delta o > \Delta d2 > \Delta d1$. Herein, the refractive indexes Nr1 and Nr2 of the first and second ring portions 283 and 285 are smaller than the refractive index Nc of the central core portion 281, and larger than the refractive indexes Nd1 and Nd2 of the first and second depressed portions 282 and 284. In addition, the refractive indexes Nd1 and Nd2 of the first and second depressed portions 282 and 284 are smaller than the refractive index No of the outside cladding layer 286. Therefore, when the refractive indexes Nr1 and Nr2 are assumed as the refractive index Nr and the refractive indexes Nd1 and Nd2 are assumed as the refractive index Nd, there is a relation Nc$\geq$Nr>No>Nd.

In addition, the ratio Ra of the outer diameter 281$c$ of the central core portion 281 to the outer diameter 282$d$ of the first depressed portion 282 was 0.6, the Rb ratio of the outer diameter 282$d$ of the first depressed portion 282 to the outer diameter 283$r$ of the first ring portion 283 was 0.63, the ratio Rc of the outer diameter 283$r$ of the first ring portion 283 to the outer diameter 284$d$ of the second depressed portion 284 was 0.61, and the ratio Rd of the outer diameter 284$d$ of the second depressed portion 284 to the outer diameter 285$r$ of the second ring portion 285 was 0.7.

A procedure for manufacturing the optical fiber preform for the multiple layered fiber of FIG. 28 employing the manufacturing method for the optical fiber preform according to the third embodiment will be described below.

First of all, a glass rod fabrication step of producing a glass rod, that is, a core rod corresponding to the central core portion 281 by the VAD method is performed.

The refractive index profile of the glass rod is measured, and the outer diameter of the central core portion and the refractive index profiles around the central core portion are designed based on the measurement result.

Apart from the glass rod fabrication step, a glass pipe with depressed and ring portions fabrication step is performed. In the glass pipe fabrication step, a silica glass pipe corresponding to the second ring portion 285 is prepared as the starting pipe. Glass layers corresponding to the second depressed portion 284, glass layers corresponding to the first ring portion 283 and glass layers corresponding to the first depressed portion 282 are formed in succession by depositing glass layers on the inner circumference of this starting pipe, thereby fabricating the glass pipe.

The glass rod is inserted into the glass pipe, and integrated with the glass pipe by collapse to produce the vitreous body.

A jacket portion becoming the outside cladding portion 286 is formed around the outer circumference of the vitreous body to fabricate the optical fiber preform. This optical fiber preform is drawn to produce the quintuple cladding fiber.

FIG. 29 shows a refractive index profile of the optical fiber preform for the sextuple cladding fiber.

In the optical fiber preform of FIG. 29, the relative refractive index difference $\Delta c$ of a central core portion 291 was 0.5%, the relative refractive index difference $\Delta d1$ of a first depressed portion 292 was −0.3%, the relative refractive index difference $\Delta r1$ of a first ring portion 293 was 0.27%, the relative refractive index difference $\Delta d2$ of a second depressed portion 294 was −0.15%, the relative refractive index difference $\Delta r2$ of a second ring portion 295 was 0.17%, the relative refractive index difference $\Delta d3$ of a third depressed portion 296 was −0.15% and the relative refractive index difference $\Delta o$ of an outside cladding layer 297 was 0%. That is, there is a relation $\Delta c \geq \Delta r1 > \Delta r2 > \Delta o > \Delta d3 = \Delta d2 > \Delta d1$. Herein, the refractive indexes Nr1 and Nr2 of the first and second ring portions 293 and 295 are smaller than the refractive index Nc of the central core portion 291, and larger than the refractive index No of the outside cladding layer 297. In addition, the refractive indexes Nd1, Nd2 and Nd3 of the first, second and third depressed portions 292, 294 and 296 are smaller than the refractive index No of the outside cladding layer 297. Therefore, when the refractive indexes Nr1 and Nr2 are assumed as the refractive index Nr and the refractive indexes Nd1, Nd2 and Nd3 are assumed as the refractive index Nd, there is a relation Nc≧Nr>No>Nd among the refractive indexes.

In addition, the ratio Ra of the outer diameter 291c of the central core portion 291 to the outer diameter 292d of the first depressed portion 292 was 0.6, the ratio Rb of the outer diameter 292d of the first depressed portion 292 to the outer diameter 293r of the first ring portion 293 was 0.63, the ratio Rc of the outer diameter 293r of the first ring portion 293 to the outer diameter 294d of the second depressed portion 294 was 0.61, the ratio Rd of the outer diameter 294d of the second depressed portion 294 to the outer diameter 295r of the second ring portion 295 was 0.7, and the ratio Re of the outer diameter 295r of the second ring portion 295 to the outer diameter 296d of the third depressed portion 296 was 0.77.

A procedure for manufacturing the optical fiber preform for the multiple layered fiber of FIG. 29 employing the manufacturing method for the optical fiber preform according to the third embodiment of the invention will be described below.

First of all, a glass rod fabrication step of producing a glass rod, that is, a core rod corresponding to the central core portion 291 by the VAD method to fabricate a glass rod is performed.

The refractive index profile of this glass rod is measured, and the outer diameter of the central core portion and the refractive index profiles around the central core portion are designed based on the measurement result.

Apart from the glass rod fabrication step, a glass pipe with depressed and ring portions fabrication step is performed. In the glass pipe fabrication step, a silica glass pipe corresponding to the third depressed portion 296 is prepared as a starting pipe. Glass layers corresponding to the second ring portion 295, glass layers corresponding to the second depressed portion 294, glass layers corresponding to the first ring portion 293 and glass layers corresponding to the first depressed portion 292 are formed in succession by depositing glass particles on the inner circumference of this starting pipe, thereby fabricating the glass pipe.

The glass rod is inserted into the glass pipe, and integrated with the glass pipe by collapse to produce a vitreous body.

A jacket portion becoming the outside cladding portion 297 is formed around the outer circumference of the vitreous body to fabricate the optical fiber preform. This optical fiber preform is drawn to produce the sextuple cladding fiber.

In manufacturing the optical fiber preforms for the multiple layered fibers of FIGS. 28 and 29, the manufacturing method for the optical fiber preform according to the second embodiment may be employed.

In this way, a multiple layered fiber having a number of layered, rather than the multiple layered fibers of FIGS. 28 and 29, may be manufactured by the manufacturing method for the optical fiber preform. In the multiple layered fiber, when there are a plurality of depressed portions and a plurality of ring portions, it is assumed that the refractive index of each depressed portion is smaller than the refractive index of the outside cladding layer, and the refractive index of each ring portion is larger than the refractive index of the outside cladding layer. At this time, for the refractive index Nc of the central core portion, the refractive index Nd of the depressed portion, the refractive index Nr of the ring portion, and the refractive index No of the outside cladding layer, there is a relation Nc≧Nr>No>Nd.

In all the examples as described above, to synthesize the jacket layer, glass particles may be deposited by the VAD method or the outside deposition method with plural burners and dehydrated and consolidated.

This invention has been described in detail with reference to the specific embodiments, but it will be apparent to those skilled in the art that numerous other variations or modifications may be effected without departing from the true spirit and scope of this invention.

This application is based on Japanese Patent Application (JP-A-2002-113280), filed on Apr. 16, 2002, its contents being incorporated herein for reference.

INDUSTRIAL APPLICABILITY

As described above, with the method for manufacturing the optical fiber preform, the method for manufacturing the optical fiber, and the optical fiber, first of all, the glass rod is fabricated by appropriately combining the central core portion and the depressed portion, each having the refractive index measured based on the refractive index profile, in accordance with the characteristics of the optical fiber to fabricate the glass rod. On the other hand, the glass pipe having the ring portion is fabricated. Then, the glass pipe and the glass rod fabricated separately are integrated by collapse, whereby the optical fiber preform and optical fiber having desired characteristics and complex profile are manufactured at high precision.

What is claimed is:

1. A method for manufacturing an optical fiber preform comprising a central core portion having a maximal value Nc of refractive index in the center, and outside the central core portion, comprising at least a depressed portion having a minimal value Nd of refractive index, a ring portion having a maximal value Nr of refractive index and an outside cladding layer having a maximal value No of refractive index, the optical fiber preform satisfying a relation of Nc≧Nr>No>Nd among the values of refractive index, the method being characterized by comprising following steps:

a glass rod fabrication step of fabricating a glass rod by inserting a core rod containing at least the central core portion into a depressed pipe containing at least the depressed portion, and integrating them;

a glass pipe fabrication step of fabricating a glass pipe having the ring portion;

an integration step of fabricating a vitreous body by integrating the glass rod and the glass pipe after inserting the glass rod into the glass pipe; and measuring a refractive index distribution of the glass rod; and designing a ratio Ra of an outer diameter of the central core portion to an outer diameter of the depressed portion, a ratio Rb of an outer diameter of the depressed portion to an outer diameter of the ring portion, and a relative refractive index difference Δr of the ring portion to the outside cladding layer based on the measurement result.

2. A method for manufacturing an optical fiber preform according to claim 1, characterized by further comprising following steps:

a measuring step of measuring a radial and longitudinal refractive index profile of the glass rod; and a designing step of designing an outer diameter of the central core portion and a refractive index profile outside the central core portion based on a measurement result of the measuring step.

3. A method for manufacturing an optical fiber preform according to claim 1, characterized in that an ellipticity of the central core portion of the glass rod is 0.4% or less, and the number of voids arising on a integrating interface of the glass rod is equal to or less than one per 10 mm in length of the glass rod.

4. A method for manufacturing an optical fiber preform according to claim 1, characterized in that the glass rod fabrication step includes an intermediate rod fabricating sub-step of fabricating an intermediate product of the glass rod with a larger diameter of the depressed portion than a desirable diameter of the depressed portion, a Ra designing sub-step of deciding a desirable ratio Ra of an outer diameter of the central core portion to an outer diameter of the depressed portion based on a measurement result of a refractive index profile for the intermediate product of the glass rod, and a Ra adjusting step of removing an outer circumferential body of the intermediate product of the glass rod to adjust the designed ratio Ra to a designed value.

5. A method for manufacturing an optical fiber preform according to claim 1, characterized in that the glass pipe fabrication step includes a ring forming sub-step of forming the ring portion on an inner surface of a starting pipe by depositing a glass layer inside the starting pipe.

6. A method for manufacturing an optical fiber preform according to claim 1, characterized in that the vitreous body integrated at the integration step has an ellipticity of 1.5% or less in the central core portion, and the number of voids arising on a integrating interface of the vitreous body is equal to or less than one per 10 mm in length of the vitreous body.

7. A method for manufacturing an optical fiber preform according to claim 1, characterized in that a jacket portion is formed on an outside of the vitreous body to have an appropriate core diameter in a drawn optical fiber.

8. A method for manufacturing an optical fiber characterized by comprising a drawing step of drawing an optical fiber preform produced by a method for manufacturing an optical fiber preform according to claim 1.

9. A method for manufacturing an optical fiber characterized by comprising a rod-in-drawing step of inserting a vitreous body according to claim 1 into a jacket pipe and drawing immediately after integrating the vitreous body and the jacket pipe.

10. An optical fiber characterized in that the optical fiber is produced by a method for manufacturing an optical fiber according to claim 8.

11. An optical fiber according to claim 10, characterized in that assuming that a ratio of an outer diameter of the central core portion $2c$ to an outer diameter of the depressed portion $2d$ is Ra=$2c/2d$, a ratio of the outer diameter of the depressed portion $2d$ to an outer diameter of the ring portion $2r$ is Rb=$2d/2r$, a relative refractive index difference $\Delta c$ of the maximal refractive index of the central core portion Nc to the maximal refractive index of the outside cladding layer No is (Nc−No)/No×100[%], a relative refractive index difference $\Delta d$ of the minimal refractive index of the depressed portion Nd to the maximal refractive index of the outside cladding layer No is (Nd−No)/No×100[%], a relative refractive index difference $\Delta r$ of the maximal refractive index of the ring portion Nr to the maximal refractive index of the outside cladding layer No is (Nr−No)/No×100[%], and an outer diameter of the outside cladding layer is $2o$, the following inequalities are satisfied, 0.20≦Ra≦0.66
0.50≦Rb≦0.80
90 μm≦$2o$<150 μm
2.5%≧$\Delta c$≧0.5%
−0.8%≦$\Delta d$≦−0.2% and
1.0%≧$\Delta r$≧0.1%
and the fiber has a dispersion value at a wavelength of 1550 nm being +8 ps/km/nm or less.

12. A method for manufacturing an optical fiber preform according to claim 5, characterized in that the starting pipe is a silica glass pipe doped with at least fluorine.

13. A method for manufacturing an optical fiber preform according to claim 5, characterized in that an MCVD method is employed to deposit the glass layer inside the starting pipe, in which a deposition rate of glass layer is 0.4 g/min or more.

14. A method for manufacturing an optical fiber preform according to claim 13, characterized in said deposition rate of glass layer is 11.0 g/min or more.

15. A method for manufacturing an optical fiber preform according to claim 13, characterized in that an induction furnace, a thermal plasma torch or an electric resistance furnace is employed as a heating source in the MCVD method.

16. A method for manufacturing an optical fiber preform according to claim 1, characterized in that an ellipticity of each of the glass rod and the glass pipe in an inner diameter or outer diameter is 1% or less, and an eccentricity of the glass rod is 1% or less.

17. An optical fiber according to claim 10, characterized in that a PMD is 0.15 ps/$\sqrt{(km)}$ or less.

18. An optical fiber according to claim 10, characterized in that an excess absorption loss at a wavelength of 1.38 μm with OH group is 0.2 dB/km or less.

19. A method for manufacturing an optical fiber preform according to claim 5, characterized by further comprising a starting pipe fabrication step, in which silica glass particles are synthesized by a VAD method, an OVD method or an outside deposition method with multiple burners, and then dehydrated and consolidated to form the starting pipe, so that the residual OH group in the starting pipe is 0.001 wtppm or less.

20. An optical fiber characterized in that the optical fiber is produced by a method for manufacturing an optical fiber according to claim 7.

21. An optical fiber according to claim 20, characterized in that assuming that a ratio of an outer diameter of the central core portion $2c$ to an outer diameter of the depressed portion $2d$ is Ra=$2c/2d$, a ratio of the outer diameter of the depressed portion $2d$ to an outer diameter of the ring portion $2r$ is Rb=$2d/2r$, a relative refractive index difference $\Delta c$ of the maximal refractive index of the central core portion Nc to the maximal refractive index of the outside cladding layer No is (Nc−No)/No×100[%], a relative refractive index difference $\Delta d$ of the minimal refractive index of the depressed portion Nd to the maximal refractive index of the outside cladding layer No is (Nd−No)/No×100[%], a relative refractive index difference $\Delta r$ of the maximal refractive index of the ring portion Nr to the maximal refractive index of the outside cladding layer No is (Nr−No)/No×100[%], and an outer diameter of the outside cladding layer is $2o$, the following inequalities are satisfied, 0.20≦Ra≦0.66
0.50≦Rb≦0.80
90 μm≦$2o$≦150 μm
2.5%≧$\Delta c$≧0.5%
−0.8%≦$\Delta d$≦−0.2% and
1.0%≧$\Delta r$≧0.1%
and the fiber has a dispersion value at a wavelength of 1550 nm being +8 ps/km/nm or less.

22. An optical fiber according to claim 20, characterized in that a PMD is 0.15 ps/$\sqrt{\text{(km)}}$ or less.

23. An optical fiber according to claim 20, characterized in that an excess absorption loss at a wavelength of 1.38 μm with OH group is 0.2 dB/km or less.

24. A method for manufacturing an optical fiber preform comprising a central core portion having a maximal value Nc of refractive index in the center, and outside the central core portion, comprising at least a depressed portion having a minimal value Nd of refractive index, a ring portion having a maximal value Nr of refractive index and an outside cladding layer having a maximal value No of refractive index, the optical fiber preform satisfying a relation of Nc≧Nr>No>Nd among the values of refractive index, the method being characterized by comprising following steps:
- a glass rod fabrication step of fabricating a glass rod becoming the central core portion;
- a glass pipe fabrication step of fabricating a glass pipe by depositing a glass layer having at least one or more refractive indexes inside a starting pipe; and
- an integration step of fabricating a vitreous body by integrating the glass rod and the glass pipe after inserting the glass rod into the glass pipe, wherein
- an ellipticity of each of the glass rod and the glass pipe in an inner diameter or outer diameter is 1% or less.

25. A method for manufacturing an optical fiber preform comprising a central core portion having a maximal value Nc of refractive index in the center, and outside the central core portion, comprising at least a depressed portion having a minimal value Nd of refractive index, a ring portion having a maximal value Nr of refractive index and an outside cladding layer having a maximal value No of refractive index, the optical fiber preform satisfying a relation of Nc≧Nr>No>Nd among the values of refractive index, the method being characterized by comprising following steps:
- a glass rod fabrication step of fabricating a glass rod becoming the central core portion;
- a glass pipe fabrication step of fabricating a glass pipe by depositing a glass layer having at least one or more refractive indexes inside a starting pipe; and
- an integration step of fabricating a vitreous body by integrating the glass rod and the glass pipe after inserting the glass rod into the glass pipe, wherein
- an MCVD method is employed to deposit the glass layer inside the starting pipe, in which a deposition rate of glass layer is 0.4 g/min or more.

26. A method for manufacturing an optical fiber preform according to claim 25, characterized in said deposition rate of glass layer is 1.0 g/min or more.

27. A method for manufacturing an optical fiber preform according to claim 25, characterized in that an induction furnace, a thermal plasma torch or an electric resistance furnace is employed as a heating source in the MCVD method.

* * * * *